(12) United States Patent
Morrison

(10) Patent No.: US 11,750,091 B2
(45) Date of Patent: Sep. 5, 2023

(54) RESONANT CONVERTER

(71) Applicant: EXCELSYS TECHNOLOGIES LTD, Cork (IE)

(72) Inventor: Richard Morrison, Cork (IE)

(73) Assignee: Excelsys Technologies Ltd., Cork (IE)

( * ) Notice: Subject to any disclaimer, the term of this patent is extended or adjusted under 35 U.S.C. 154(b) by 110 days.

(21) Appl. No.: 17/232,004

(22) Filed: Apr. 15, 2021

(65) Prior Publication Data

US 2022/0337171 A1 Oct. 20, 2022

(51) Int. Cl.
*H02M 3/00* (2006.01)
*H02M 7/48* (2007.01)
*H02M 1/44* (2007.01)
*H02M 1/00* (2006.01)
*H02M 3/335* (2006.01)

(52) U.S. Cl.
CPC ............. *H02M 3/01* (2021.05); *H02M 1/008* (2021.05); *H02M 1/44* (2013.01); *H02M 3/33571* (2021.05); *H02M 7/4818* (2021.05)

(58) Field of Classification Search
CPC .... H02M 3/01; H02M 3/015; H02M 3/33561; H02M 3/33571; H02M 7/4815; H02M 7/4818; H02M 1/0067; H02M 1/008; H02M 1/44; H02M 1/4241
See application file for complete search history.

(56) References Cited

U.S. PATENT DOCUMENTS 8,629,627 B2   1/2014  Cohen et al.
9,130,462 B2   9/2015  Hu et al.
2010/0026095 A1   2/2010  Phadke
2010/0097826 A1   4/2010  Xu et al.
2011/0316430 A1  12/2011  Cohen et al.
2016/0072388 A1*  3/2016  Dubus ............... H02M 3/33571
                                                  363/25
2017/0133940 A1   5/2017  Wilkinson et al.
2018/0183351 A1*  6/2018  Yamada ............ H05K 7/20909
(Continued)

FOREIGN PATENT DOCUMENTS

KR       101464478 B1    11/2014

OTHER PUBLICATIONS

International Search Report and Written Opinion for PCT Application No. PCT/EP/2022/059699, filed Apr. 12, 2022, dated Jul. 26, 2022; 15 pages.

*Primary Examiner* — Alex Torres-Rivera

(57) ABSTRACT

This disclosure describes systems, methods, and apparatus for controlling a voltage provided to a plurality of configurable output modules using a resonant converter, the resonant converter comprising: an inverter circuit; a resonant capacitor bridge coupled across the inverter circuit; N groups of output modules, each of the N groups comprising terminals configured for coupling to up to M output modules, the output modules each comprising: a transformer having a primary and a secondary; and a rectified output coupled to the secondary and configured for coupling to a load; and a resonant inductor network configured to be coupled between the resonant capacitor bridge and the primaries of the transformers, the resonant inductor network comprising: at least one parallel inductor; and N parallel branches arranged in parallel and each branch comprising a series inductor, each of the series inductors configured for transformer-coupling to up to M output modules.

20 Claims, 18 Drawing Sheets

(56) References Cited

U.S. PATENT DOCUMENTS

2019/0043661 A1\* 2/2019 Jin .......................... H01F 27/24
2019/0058408 A1    2/2019 Hao et al.
2020/0220469 A1    7/2020 Morrison et al.
2020/0395164 A1\* 12/2020 Ahmed ............... H01F 27/2804

\* cited by examiner 1200-a 1200-b 1200-c 1200-d 1200-e

RESONANT CONVERTER

FIELD OF THE DISCLOSURE

The present disclosure relates generally to resonant tanks. In particular, but not by way of limitation, the present disclosure relates to a branched resonant tank for a resonant converter.

DESCRIPTION OF RELATED ART

LLC resonant converters are power supply devices that convert a DC input into an AC output. LLC resonant converters are widely used in a variety of applications including audio, medical, industrial, communications, and military applications. The LLC resonant topology has gained a reputation for unparalleled efficiency compared to conventional PWM converters. Its unique characteristic of zero voltage switching not only reduces the switching losses of powering the MOSFETs but provides smooth voltage and current commutation that results in very low EMI noise generation. As a consequence, it provides an avenue for a more efficient, power dense, fan-less supply of power with relatively low noise generation.

Such converters include switches coupled between a DC voltage input and an LC section that generally includes one or more inductors (L) and capacitors (C). The switches, which may be implemented using MOSFET transistors, are switched on and off at a particular switching frequency to generate a square wave that is provided as an input to the LC section (which may be referred to as an "LLC tank" or a "resonant tank"). The LLC tank filters the input square wave and generates a sinusoidal output current that can be provided to primaries of transformers each forming an input for one of multiple isolated output modules. The output modules often include rectification and optionally post regulation, such that each module produces a regulated DC voltage.

The transformers may be used for voltage scaling and signal isolation, and may produce an output signal that is provided as a power supply to a load (e.g., a circuit or device). The output power of the LLC resonant converter depends on the switching frequency of the input square wave relative to the resonant frequency of the LLC tank.

However, the state of existing LLC resonant converters, especially for high power applications, is challenged due to significant power loss, thermal challenges, risk of a short, and/or presence of multiple high frequency eddy currents.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In some cases, multiple outputs may be desired from a single resonant converter, for instance, where multiple low voltage outputs are desired. Where multiple outputs are desired, the sinusoidal output current can be provided to primaries of two or more transformers that are part of output modules. The primaries can be arranged in parallel and the secondaries can be isolated from each other and can be coupled through rectification sections to separate outputs. For example, U.S. Patent Publication No. (herein referred to as the '940 publication) discloses a LLC resonant converter circuit with multiple transformers having their primaries coupled in parallel and LLC resonant tank in the form of a series and parallel inductor coupled across these primaries. The '940 publication is incorporated herein by reference in its entirety. In some practical implementations of the circuits in the '940 publication, the transformers may be formed in traces on PCB boards, which are more susceptible to off-gassing flammable vapors when a short, and thus current spike, occurs. These flammable vapors pose a fire hazard. To reduce the risk of a short leading to fire, the LLC tank can be split into branches of series and parallel inductors as shown in FIGS. 3 and 4 of this disclosure. Such branching splits current density between the branches, such that a short may only release current from a given branch. As such, a short in a three-way branched LLC converter leads to ⅓ the current that would be seen in a non-branched LLC converter, and hence a much-reduced chance of releasing flammable vapors.

In some instances, the rectification sections of the output modules can use diodes, though other applicable switches can also be used. For instance, synchronous rectification, via use of MOSFETs, can be used with off-the-shelf controllers to sense current on a diode and control switching of the MOSFETs to optimize rectification. Yet, since the inverter of the LLC converter often switches frequency to maintain a consistent output, the MOSFET controller sometimes is late to turn off, thereby shorting the diodes for a few nanoseconds. While such shorts are unlikely catastrophic, they do increase power losses and interference. The above-mentioned branching of the LLC tank helps reduce the effects of these temporary shorts by providing lower current densities to each branch during a short.

Putting the concept of branching aside for a moment, the outputs of the LLC converter output modules may or may not be regulated, depending on application. For instance, regulation allows an output that can be trimmed to various levels (e.g., 5V-50V). However, and especially where a buck converter is used to perform the regulation, greater board space is used (e.g., buck converters use a large inductor) and the regulator can lead to increased EMI. Thus, variable output comes with tradeoffs. Accordingly, some output modules may forgo output regulation in favor of lowered EMI and more efficient use of board space. Yet, without output regulation, these modules often maintain a desired output via a feedback loop to the switches of the LLC converter—in other words, these "bulk" modules control the switching frequency of the LLC converter in order to achieve desired outputs. As an example, U.S. Patent Publication No. 2020220469 shows an example of a "bulk module" in the dashed area of FIG. 2, and the contents of this published application are incorporated herein by reference. Where a bulk module controls the LLC converter switching frequency, the non-bulk modules use post regulation to achieve their lower and trimmed outputs.

Since the bulk modules do not have post regulation, all bulk modules provide related output—as controlled by the LLC converter switching frequency. For instance, bulk modules with the same number of turns in the transformer should provide similar output, though different loads can lead to different outputs. However, some bulk modules may have transformers with different turns ratios (e.g., one bulk module may be configured to provide 48V while another provides 24V). Where multiple bulk modules are used, one is considered the master and controls the LLC converter switching frequency, and the designer hopes that the other bulk modules receive similar outputs from the LLC converter. Where a typical LLC tank as shown in FIGS. 1-2 is used, the parallel arrangement of tank inductors and the bulk module transformers leads to consistent outputs from the bulk modules. However, where a branched tank topology is used, as seen in FIGS. 4-7 for instance, the bulk modules are not arranged in parallel and thus each sees different current and voltage. Thus, the master-slave feedback concept breaks down where bulk modules and branched tank topology are used together.

Thus, there is a need for a cost-effective LLC resonant converter topology suitable for high power applications, which not only optimizes resonant tank gains, but also minimizes power loss.

Some embodiments of the disclosure may be characterized as a resonant converter circuit comprising: an inverter circuit; a resonant capacitor bridge coupled across the inverter circuit; N groups of output modules, each of the N groups comprising terminals configured for coupling to up to M output modules, the output modules each comprising: a transformer having a primary and a secondary; and a rectified output coupled to the secondary and configured for coupling to a load; and a resonant inductor network configured to be coupled between the resonant capacitor bridge and the primaries of the transformers, the resonant inductor network comprising: at least one parallel inductor; and N parallel branches arranged in parallel and each branch comprising a series inductor, each of the series inductors configured for transformer-coupling to up to M output modules.

Other embodiments of the disclosure may also be characterized as a power supply unit with one or more configurable outputs, the power supply unit comprising: a resonant converter circuit having an inverter circuit, a resonant capacitor bridge coupled across the inverter circuit, and a resonant inductor network; a controller; N groups of output modules, each of the N groups comprising up to M sets of terminals configured for coupling to up to M output modules, the output modules each comprising: a transformer having a primary and a secondary winding; a rectified output coupled to the secondary and configured for coupling to a load; wherein the resonant inductor network is configured to be coupled between the resonant capacitor bridge and the primaries of the transformers, the resonant inductor network comprising: at least one parallel inductor; and N parallel branches arranged in parallel, wherein each branch comprises a series inductor, each of the series inductors configured for transformer-coupling to the up to M output modules; at least one post output module regulator configured to be coupled between a respective secondary winding and a respective load of at least one output module, wherein one of the at least one post output module regulator is configured to couple to the controller and control a switching frequency of the inverter circuit.

Other embodiments of the disclosure can be characterized as a system comprising a resonant converter having an inverter circuit, a resonant capacitor bridge coupled across the inverter circuit, and a resonant inductor network; N groups of output modules, each of the N groups comprising up to M sets of terminals configured for coupling to up to M output modules, the output modules each comprising: a transformer having a primary and a secondary winding, the secondary winding configured for coupling to a load; wherein the resonant inductor network is configured to be coupled between the resonant capacitor bridge and the primaries of the transformers, the resonant inductor network comprising: at least one parallel inductor; and N parallel branches arranged in parallel, wherein each branch comprises a series inductor, each of the series inductors configured for transformer-coupling to the up to M output modules; wherein at least one set of output terminals for each branch comprises three terminals, wherein a first of the three terminals for each branch is configured to be coupled to a high voltage for the corresponding branch, and wherein a second of the three terminals for each branch is configured to be coupled to a low voltage input for the corresponding branch, wherein the first of the three terminals for a first branch is configured to be connected to a third of the three terminals of at least one other branch, including a second branch; a first output module without output regulation, wherein the first output module is configured to be coupled to the three terminals in the first branch, and wherein the first output module comprises an internal connection between its first and third terminals; a post output module regulator configured to be coupled between a secondary winding and a load of the first output module; a second output module without output regulation, wherein the second output module is configured to be connected to the three terminals in the second branch, and wherein the second output module comprises an internal connection between its first and third terminals such that a primary winding of the first output module is coupled in parallel to a primary winding of the second output module; and a non-transitory, tangible computer readable storage medium, encoded with processor readable instructions to perform a method for controlling a voltage provided to at least a portion of the output modules, including the first and second output modules, the method comprising: receiving, from the first output module, a feedback signal; and controlling the switching frequency for the inverter circuit based on the feedback signal.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

Figure 1:
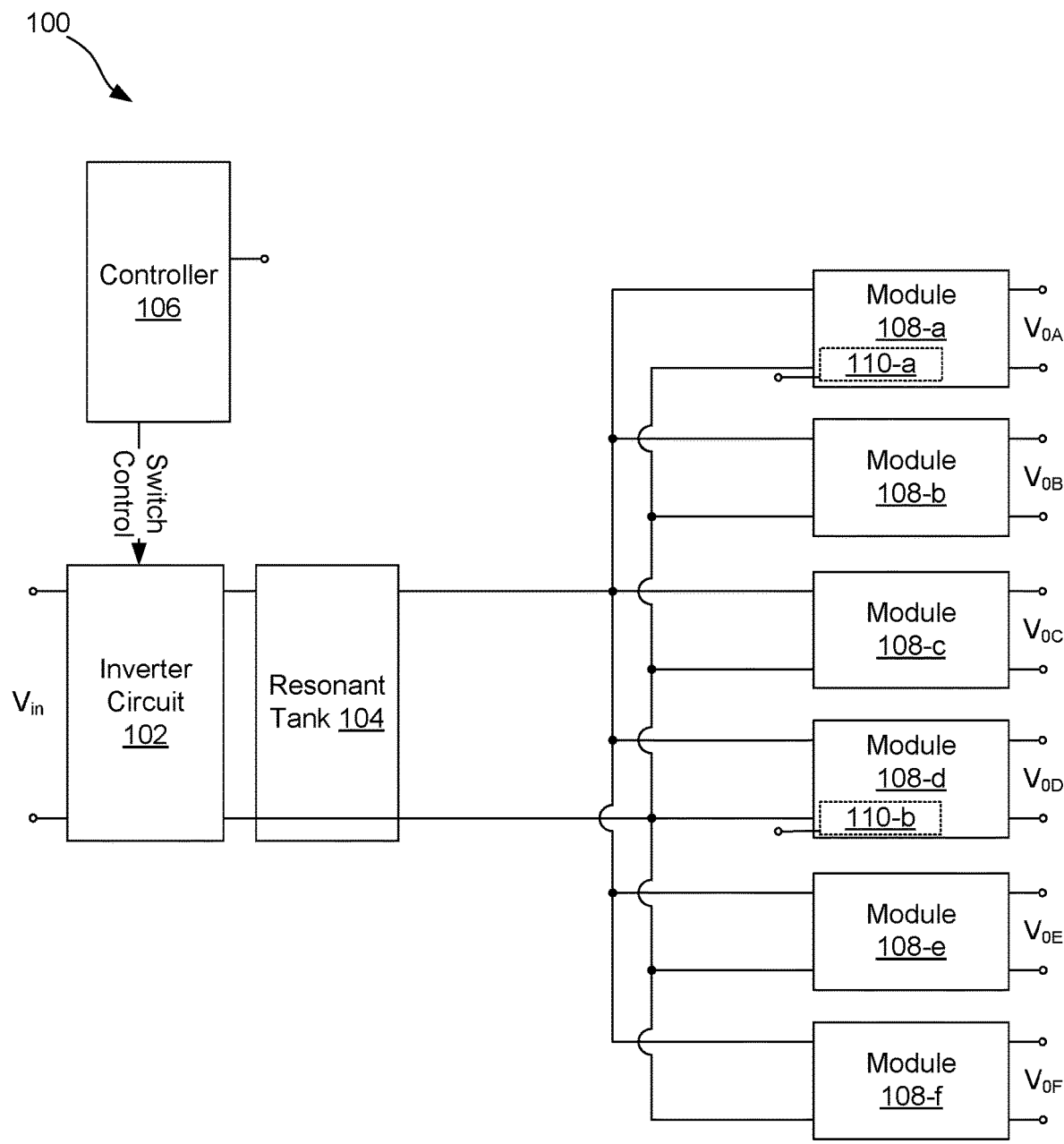
FIG. 1 illustrates a system diagram of a resonant converter in accordance with one or more implementations.

The present disclosure relates generally to a resonant tank. More specifically, but without limitation, the present disclosure relates to systems, methods, and apparatuses for driving a plurality of output circuits using a resonant converter with a branched resonant tank.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present disclosure. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present.

Embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

To overcome the aforementioned challenges of bulk modules failing to operate at the voltage and current dictated by the master bulk module's control of the LLC converter switching frequency, this disclosure describes systems, methods, and apparatuses for causing convergence of currents and voltages on bulk modules in separate branches.

Figure 11:
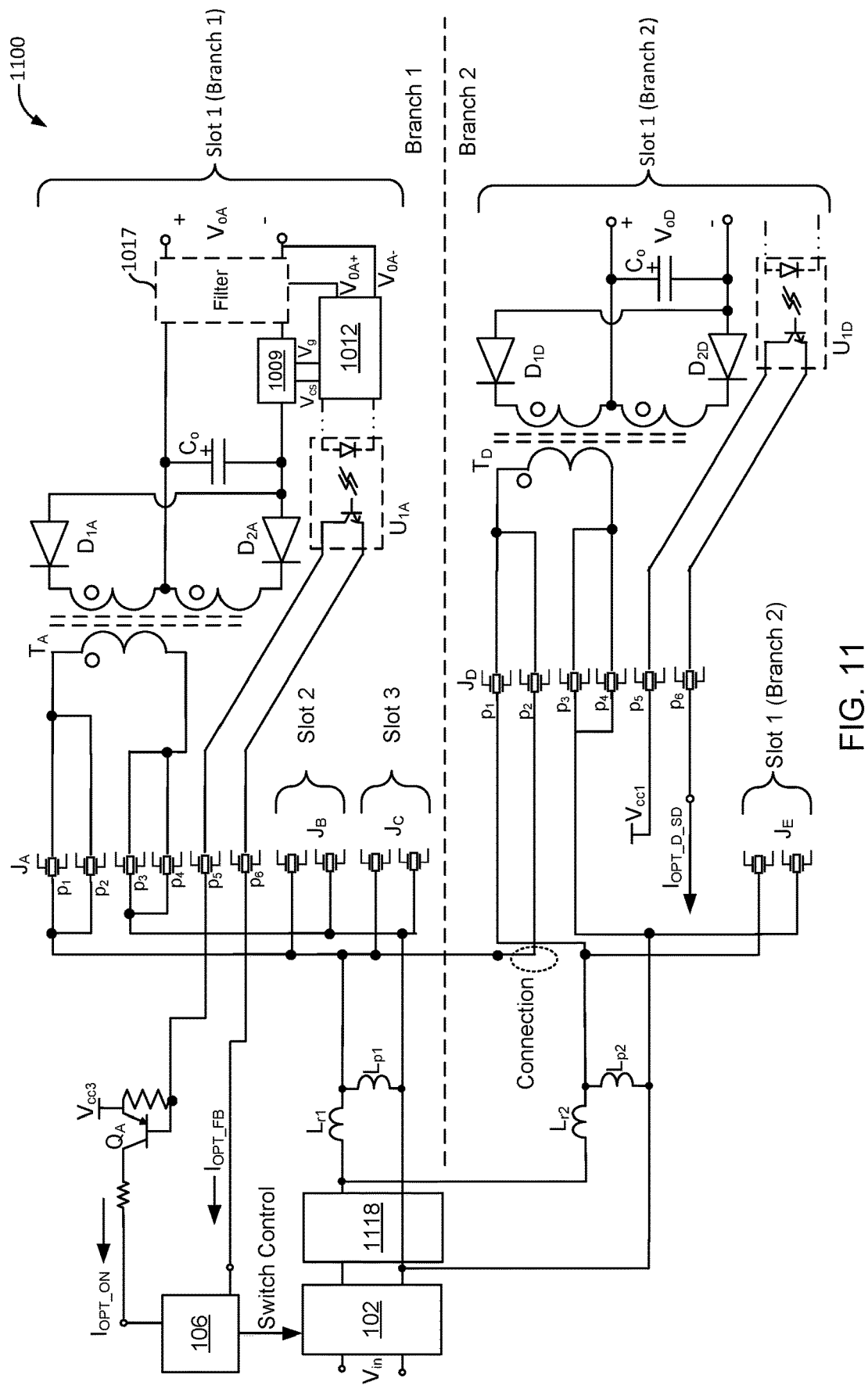
FIG. 11 illustrates a resonant converter with bulk modules in separate branches, according to an embodiment of the disclosure.
Figure 12A:
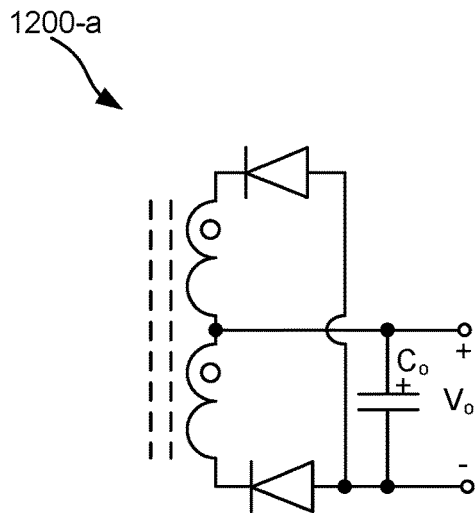
FIGS. 12A, 12B, 12C, 12D, and 12E show some example rectifier circuit topologies, in accordance with one or more implementations.
Figure 12B:
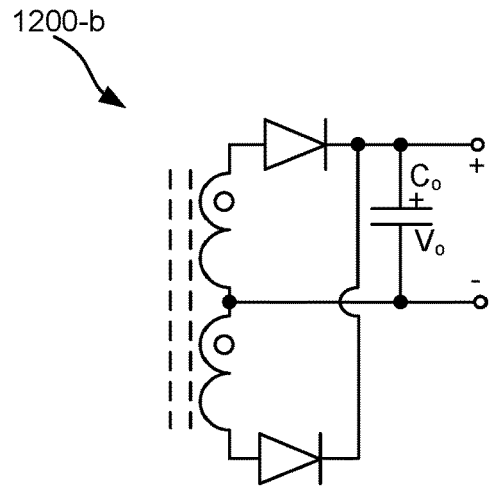
Figure 12C:
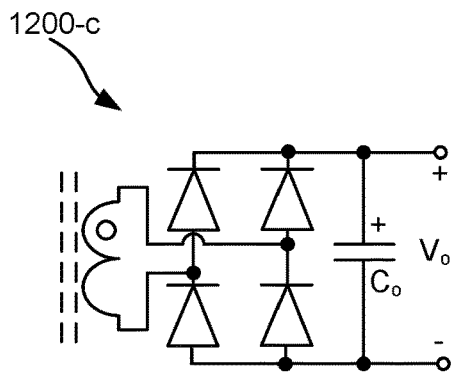
Figure 12D:
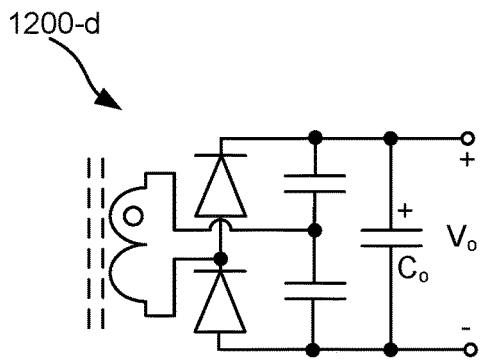
Figure 12E:
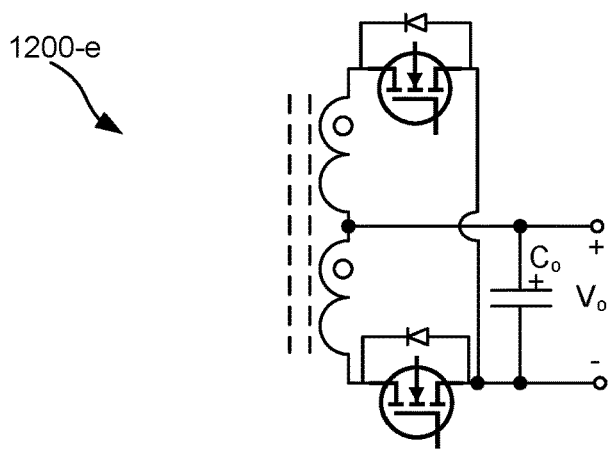
Figure 18:
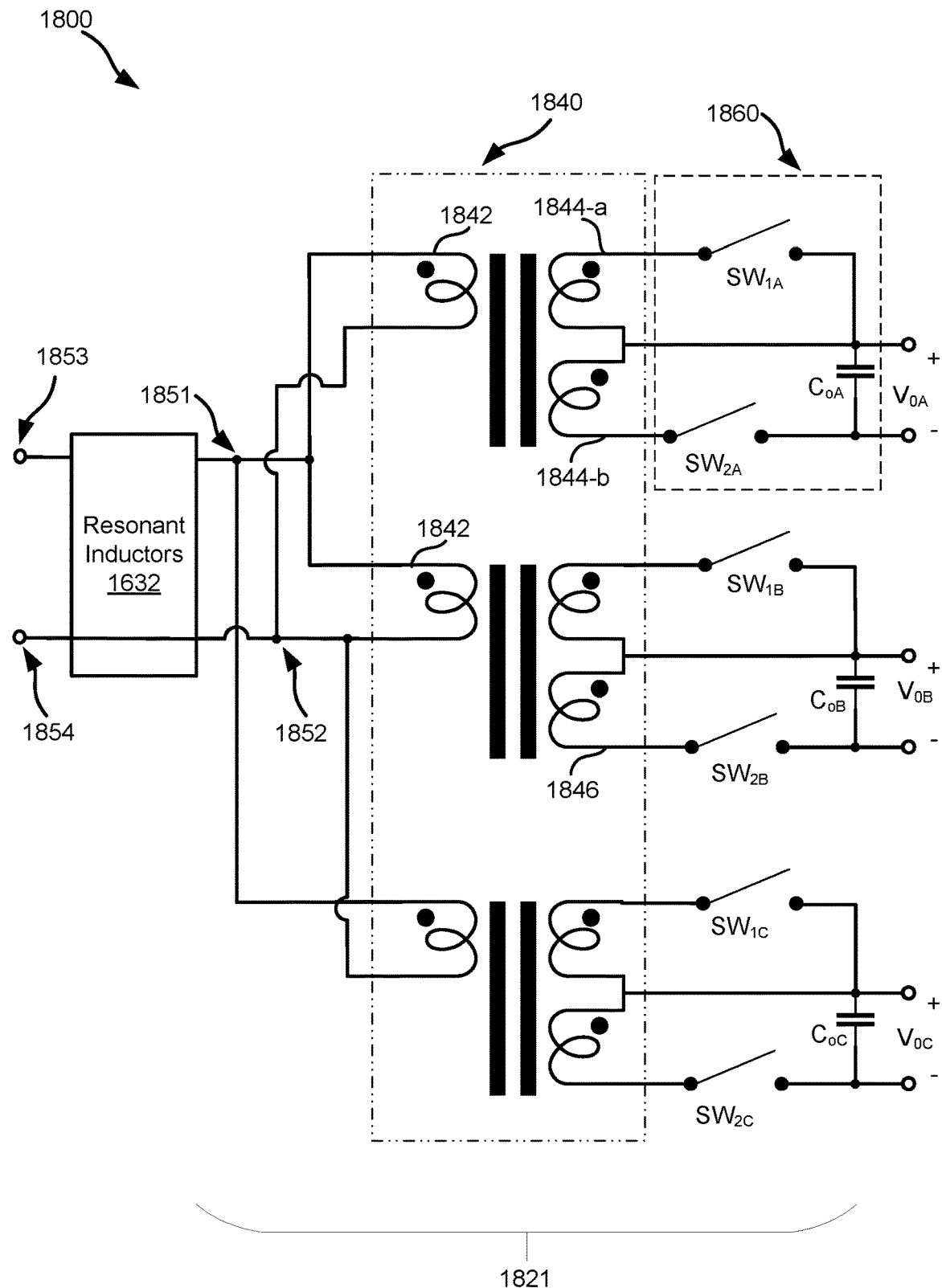
FIG. 18 illustrates an example schematic diagram of a rectifier network showing one or more transformers in accordance with one or more implementations.

FIG. 1 illustrates a system diagram of a resonant converter 100 in accordance with one or more implementations. As shown, the resonant converter 100 may comprise an inverter circuit 102, a resonant tank 104, one or more modules 108 (e.g., modules 108-a, 108-b, 108-c, 108-d, 108-e, and 108-f), and a controller 106. In some cases, the inverter circuit 102 may be implemented as a switch network (e.g., shown as switch network 720 in FIGS. 7 and/or 8). In some cases, the controller 106 may be configured to control one or more switches (e.g., MOSFETs) in the inverter circuit 102. In some embodiments, each of the one or more modules 108 may comprise a transformer having one or more primary and secondary windings. FIG. 11 provides one example of bulk modules such as modules 108-a and/or 108-d shown in FIG. 1. Further, FIG. 18 provides one example of a trio of such modules (e.g., modules 108-b, 108-c, etc.) shown in FIG. 1. Further, one or more modules 108 (e.g., modules 108-a and 108-d) may comprise an opto-coupler module 110 (e.g., optional optocoupler module 110-a, optional opto-coupler module 110-b), for instance, having a collector and an emitter, or some other device for transferring data over the isolation boundary and back to the controller 106. In some examples, each of the one or more modules 108 may further comprise a rectifier circuit coupled to the secondary windings of the respective transformer of the given module 108. As shown, the resonant converter 100 may comprise a plurality of connections to couple the modules 108 in parallel. For instance, the primary windings of the plurality of transformers (not shown) may be coupled at one end to the resonant tank 104 and at another end to the inverter circuit 102. The secondary windings of the transformers of the output modules 108 may be configured for coupling to output loads (not shown), where the voltage delivered across the output loads may be represented by $V_{OA}$, $V_{OB}$, $V_{OC}$, $V_{OD}$, $V_{OE}$, and $V_{OF}$. In some embodiments, the opto-coupler modules 110, or other devices for transferring data over the isolation boundary, may be coupled to the controller 106. Further, the output from at least one opto-coupler module 110 (e.g., opto-coupler module 110-a) may be monitored by the controller 106 based on which the controller 106 may adjust the switching frequency of the inverter circuit 102. In some instances, multiple modules 108 may have opto-coupler modules 110, but only one of these may provide data to the controller 106 for adjusting the switching frequency of the inverter circuit 102. In this way, one of the modules 108 can control, via its opto-coupler module 110, the resonant converter switching frequency, and hence power delivered to each of the modules 108.

Figure 2:
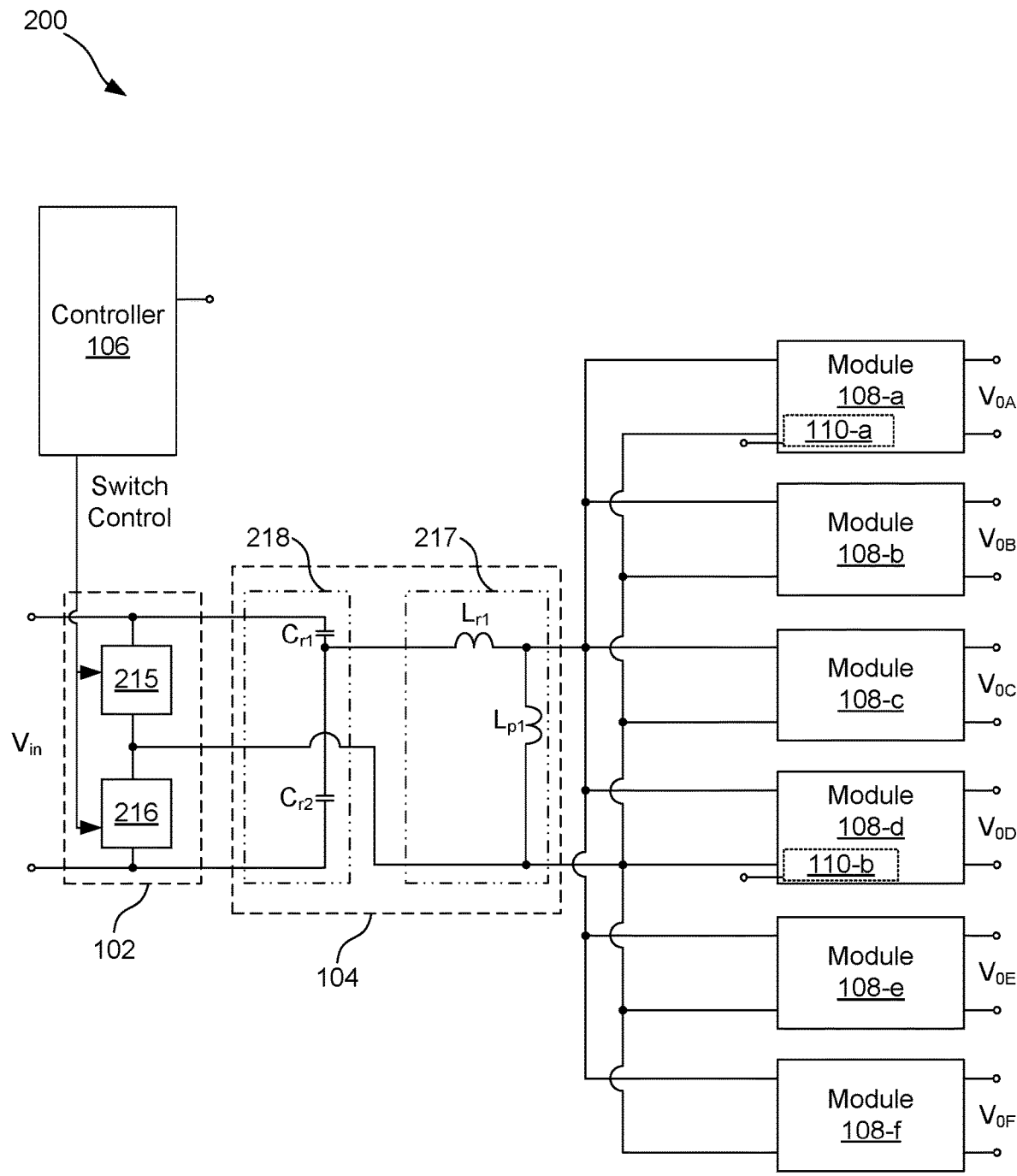
FIG. 2 illustrates an example schematic diagram of the resonant converter in FIG. 1 in accordance with one or more implementations.

FIG. 2 illustrates an example schematic diagram of a resonant converter 200 in accordance with one or more implementations. In some examples, resonant converter 200 may be similar or substantially similar to the resonant converter 100 in FIG. 1. Resonant converter 200 includes a controller 106, an inverter circuit 102, and a resonant tank 104. The inverter circuit 102 may comprise switches 215 and 216, which may be examples of MOSFETs, or another applicable switch. In the example shown, the switches 215 and 216 may be arranged in a half-bridge configuration and may be configured to receive control instructions from the controller 106. The control instructions may be used to adjust the switching frequency of the inverter circuit 102.

In some embodiments, the resonant tank 104 may comprise a resonant capacitor bridge 218 (e.g., a resonant capacitor half-bridge) comprising one or more resonant capacitors (e.g., $C_{r1}$, $C_{r2}$) coupled across the inverter circuit 102, and a resonant inductor network 217 comprising one or more resonant inductors ($L_{r1}$, $L_{p1}$), where one end of the resonant inductor network 217 is coupled to a center of the resonant capacitor bridge 218 and another end is coupled to a center of the half-bridge configuration of switches 215 and 216. For instance, the resonant inductor network 217 may comprise at least one series inductor (e.g., $L_{r1}$) and at least one parallel inductor (e.g., $L_{p1}$), where a first end of the series inductor is coupled to the center of the resonant capacitor bridge 218 and the second end is coupled to a first end of the parallel inductor. Further, the second end of the parallel inductor may be coupled to the center of the inverter circuit, for instance, between the switches 215 and 216. In some cases, the second end of the series inductor and the first end of the parallel inductor may also be coupled to first ends of the primary windings of the transformers of the output modules 108, while the second ends of the primary windings of the transformers may be coupled to the second end of the parallel inductor and/or the center of the inverter circuit. In this way, the primary windings of the transformers of the output modules 108 may be coupled in parallel across the parallel inductor (i.e., $L_{p1}$). In some circumstances, such a configuration may facilitate in minimizing ripples (or amplitude variations) in the output voltages delivered to the output loads. In one example, using this configuration, the output voltage at no load gets significantly higher (e.g., >10%, >5%, >15%, etc.) than at heavy load. In some embodiments, buck converter post-regulators may be utilized on the secondary side of the transformers prior to delivery of output power, further described in relation to FIG. 10A. In some cases, the maximum output power delivered through buck converter post-regulators may vary, for instance, depending on the number of transformers used. In one non-limiting example, up to 4 transformers may be connected in parallel to deliver a maximum output power of 600 W. In another example, up to 6 transformers may be connected in parallel for delivering a maximum output power of 1.8 kW through buck converter post-regulators. In yet other cases, up to 6 transformers may be utilized to deliver a maximum output power of 1 kW. In some other cases, up to 9 transformers may be utilized to deliver a maximum output power of 2.7 kW using a combination of buck converter post regulators and post FET regulators or linear regulators, further described in relation to FIGS. 10A-B and 13-14.

It should be noted that the number of transformers and maximum output powers described above are merely examples, and not intended to be limiting. In some cases, each output module 108 may be one of convection cooled or forced air cooled. In some examples, convection cooling may comprise natural convection cooling, wherein air surrounding the object (e.g., transformer core) transfers the heat away from the object without utilizing any fans or blowers. In some other examples, convection cooling may comprise the use of another fluid (e.g., oil or water), for instance, if the transformer is an oil immersed transformer. In such cases, the heat generated in the core and winding may be transferred to the oil. Some non-limiting examples of oil immersed transformers may include Oil Natural Air Natural (ONAN) transformers, Oil Natural Air Forced (ONAF)

transformers, Oil Forced Air Forced (OFAF) transformers, and Oil Forced Water Forced (OFWF) transformers.

To reduce losses from high currents on a single bus and to reduce the chances of fire from high current densities, the resonant inductor network can be split into branches, thereby reducing a current density delivered to each of multiple groups of output modules. Non-limiting examples of branched resonant inductor networks are presented in FIGS. 3-9 and 11.

Figure 3:
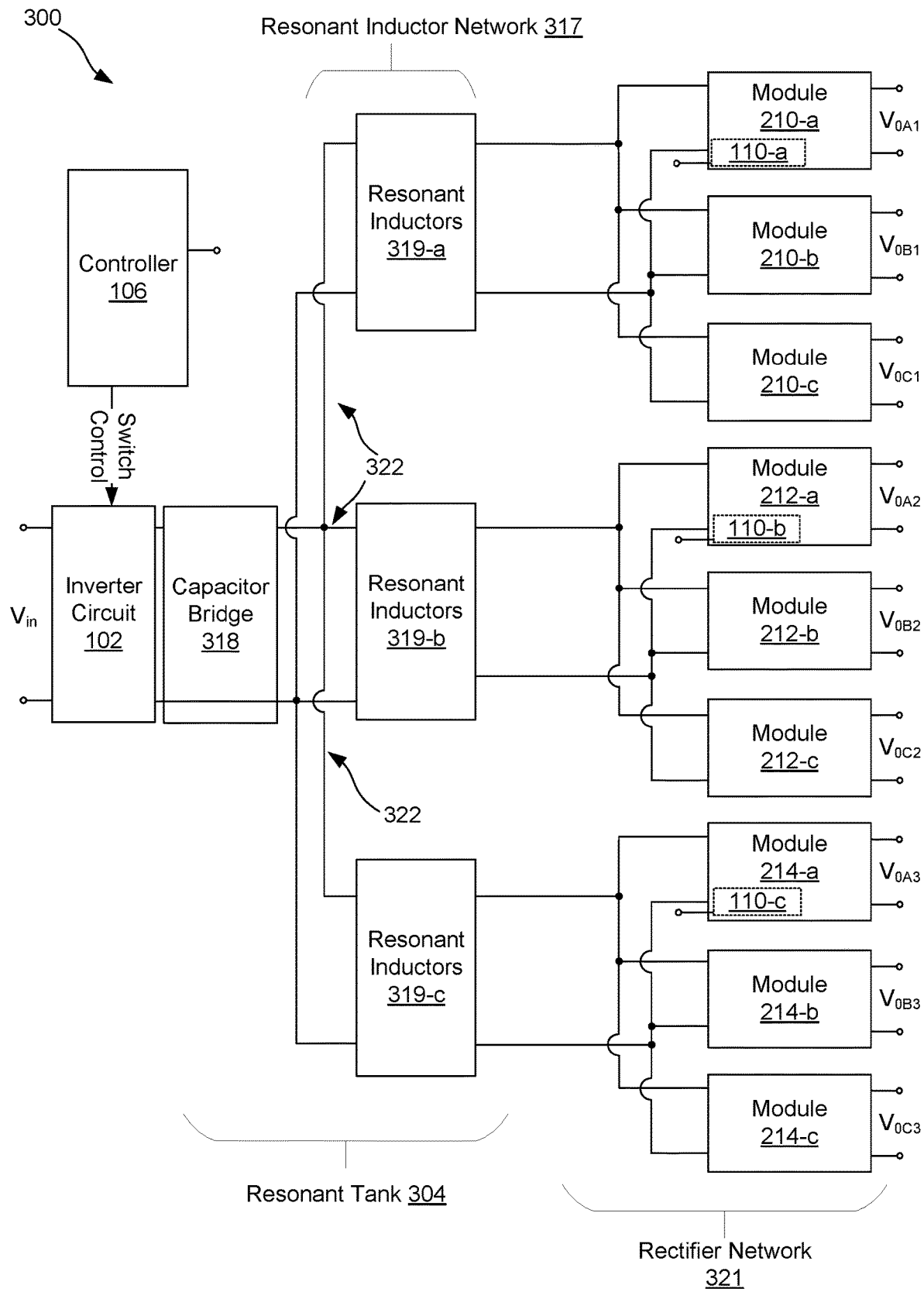
FIG. 3 illustrates a system diagram of a resonant converter according to an embodiment of the disclosure.

FIG. 3 illustrates a system diagram of a resonant converter 300 according to an embodiment of the disclosure. Resonant converter 300 may implement one or more aspects of the figures described herein. In some embodiments, the resonant converter 300 may comprise a resonant tank 304, the resonant tank comprising a resonant capacitor bridge 318 and a resonant inductor network 317. The resonant capacitor bridge 318 may be similar or substantially similar to the resonant capacitor bridge 218 described in relation to FIG. 2. As shown, the resonant tank 304 may comprise a plurality of branches 322, each branch comprising one or more resonant inductors 319 (e.g., resonant inductors 319-$a$, 319-$b$, 319-$c$). In some cases, the resonant inductors 319 may comprise at least one series inductor, at least one parallel inductor, or a combination thereof, further described in relation to FIG. 4. The resonant converter 300 may further comprise a rectifier network 321, where the rectifier network 321 comprises a plurality of connections for coupling to one or more groups of modules, for instance, a first group of modules 210 (e.g., modules 210-$a$, 210-$b$, 210-$c$), a second group of modules 212 (e.g., modules 212-$a$, 212-$b$, 212-$c$), and a third group of modules 214 (e.g., modules 214-$a$, 214-$b$, 214-$c$). In some cases, each of the one or more modules of the different groups of modules may comprise a transformer having primary and secondary windings, further described in relation to FIGS. 10, 11, 13, 14, and 18. As seen in FIG. 3, each branch of resonant inductors 319 may be coupled to a group of modules such that the primary windings of the transformers in each group may be connected in parallel. In some embodiments, a first end of the primary windings of the transformers in a group may be connected to a second end of a series inductor of a respective branch, while the second end of the primary windings may be coupled to the inverter circuit 102. In one example, the second ends of the primary windings of the transformers may be coupled to a center of a half-bridge configuration of MOSFETs of the inverter circuit 102. Additionally, a first end of the series inductor of a respective branch may be coupled to the capacitor bridge 318, for instance, at a center of the capacitor bridge 318. In some examples, the secondary winding of each transformer of the multiple groups of transformers may be configured to be coupled to an output load (not shown). In FIG. 3, the voltages ($V_{OA1}$, $V_{OB1}$, $V_{OC1}$, $V_{OA2}$, $V_{OB2}$, $V_{OC2}$, $V_{OA3}$, $V_{OB3}$, $V_{OC3}$) represent the output voltages delivered by the different modules across the different output loads. While not shown, the rectifier network 321 may comprise one or more rectifier circuits, further described in relation to FIGS. 10, 12, and 18, where the secondary winding of each transformer may be coupled to an output load through one of the one or more rectifier circuits. In some cases, the output of each transformer may be rectified by the rectifier circuit and further stabilized (e.g., using a capacitor coupled across the output load to minimize ripple voltage) to provide a stable output voltage (e.g., $V_{OA1}$, $V_{OB1}$, $V_{OC1}$, etc.).

The resonant converter topology described in relation to FIG. 3 serves to divide the primary current into one or more branches (e.g., 3 branches in FIG. 3, but any other number of two or more branches can also be implemented), such that each series inductor is subject to a fraction (e.g., Current$_{max}$/N where N is the number of branches) of the maximum current relative to the series inductor in FIGS. 1 and/or 2. Similar branching and the resulting reduction in current for each branch can be seen in FIG. 4.

Figure 4:
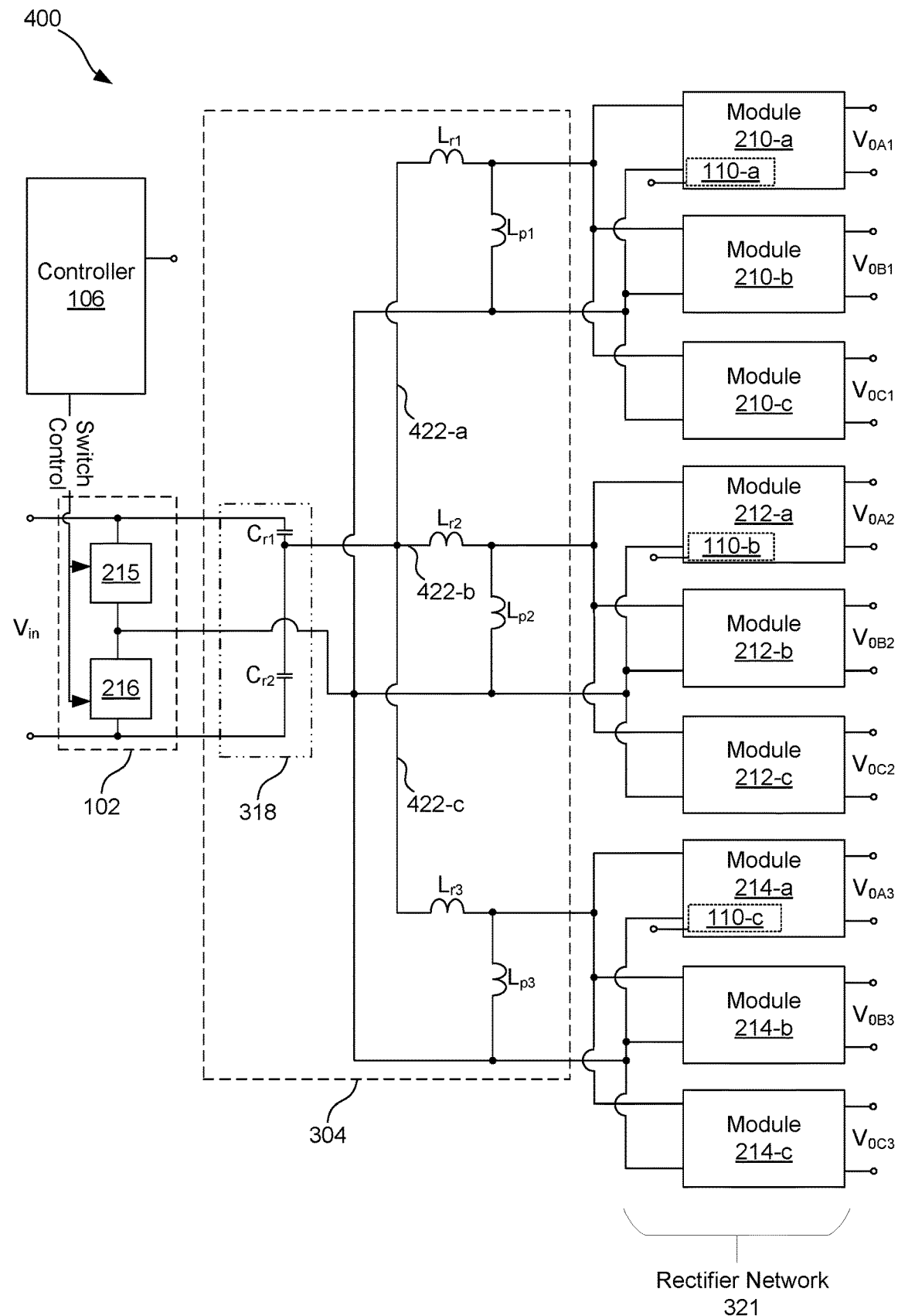
FIG. 4 illustrates an example schematic diagram of the resonant converter in FIG. 3 according to an embodiment of the disclosure.

In some cases, the resonant converters in FIGS. 2, 3, and 4 may utilize the same transformer cores and the same number of turns in their primary and secondary windings. However, the air gaps in the cores of the series inductors $L_{r1}$, $L_{r2}$, $L_{r3}$ may be reduced in FIGS. 3 and/or 4 as compared to FIG. 2, which may serve to increase the inductance (e.g., double the inductance) and thus maintain the same resonant frequency. In this way, while the series inductors $L_{r1}$, $L_{r2}$, $L_{r3}$ in FIGS. 2, 3, and 4 may have the same core loss, the series inductors $L_{r1}$, $L_{r2}$, $L_{r3}$ in FIGS. 3 and/or 4 may have lower conduction losses. In some cases, however, the use of multiple parallel inductors (e.g., one for each branch) to balance the resonant tank gains of each branch may add cost and/or power loss. Additionally or alternatively, the topology described in relation to FIGS. 3 and/or 4 may also introduce thermal challenges because of the increase in space associated with multiplying the number of series and parallel inductors by the number of branches compared to a non-branched topology (e.g., FIGS. 1-2).

FIG. 4 illustrates an example schematic diagram of a resonant converter 400 according to an embodiment of the disclosure. In some examples, the resonant converter 400 may be similar or substantially similar to the resonant converter 300 in FIG. 3, and may include the controller 106, the inverter circuit 102 having switches 215 and 216, the resonant tank 304 having a resonant capacitor bridge 318 coupled across the inverter circuit 102, and the rectifier network 321. As shown, the resonant tank 304 may comprise a plurality of branches 422 (e.g., branch 422-$a$, branch 422-$b$, branch 422-$c$), each branch comprising one or more resonant inductors, including at least one series inductor (e.g., $L_{r1}$, $L_{r2}$, $L_{r3}$). In this example, each branch may further comprise at least one parallel inductor (e.g., $L_{p1}$, $L_{p2}$, $L_{p3}$) such that the number of series inductors is equal to the number of parallel inductors.

In the example shown, the rectifier network 321 may comprise one or more groups of modules (e.g., modules 210, modules 212, modules 214) or transformers, where each group of modules or transformers is coupled to one branch of the plurality of branches 422. For instance, a first group comprising modules 210-$a$, 210-$b$, 210-$c$ may be coupled to a first branch 422-$a$ of resonant inductors, a second group comprising modules 212-$a$, 212-$b$, and 212-$c$ may be coupled to a second branch 422-$b$ of resonant inductors, and a third group comprising modules 214-$a$, 214-$b$, and 214-$c$ may be coupled to a third branch 422-$c$ of resonant inductors. As noted above, each of the modules 210, 212, and 214 may comprise a transformer having primary and secondary windings, where the secondary windings are configured to be coupled to an output load. In some embodiments, the modules 210, 212, and 214 may further comprise a rectifier circuit for stabilizing the output voltage (e.g., $V_{OA1}$, $V_{OB1}$, $V_{OC1}$, $V_{OA2}$, $V_{OB2}$, $V_{OC2}$, $V_{OA3}$, $V_{OB3}$, $V_{OC3}$) delivered to the output loads. In some cases, one end of the series resonant inductor (e.g., $L_{r1}$) of each branch 422 may be coupled to the resonant capacitor bridge 318. Further, another end of the series resonant inductor (e.g., $L_{r1}$) and one end of the parallel inductor (e.g., $L_{p1}$) of each branch may be coupled to one end of the primary windings of the transformers in one of the one or more groups. Additionally, the other end of the parallel inductor in each branch and the other ends of the primary windings of the transformers in each group may be coupled to a center of the inverter circuit 102. In some examples, the inverter circuit 102 may comprise a half-bridge configuration of MOSFETs. In this way, the primary windings of the transformers in each group may be coupled in parallel across the resonant tank 304.

In some embodiments, at least a portion of output modules of the one or more branches may be coupled to post regulators (e.g., buck converter post regulators, buck-boost converter post regulators, boost converter post regulators, to name a few non-limiting examples), which may serve to adjust the output voltages delivered to their respective loads. For instance, one or more post regulators may each be coupled between the secondary windings of a respective output module and a respective load. In some other cases, the post regulators may be examples of linear regulators. In some non-limiting examples, a linear regulator may be coupled across the secondary windings of an output module with an opto-coupler module, such as module 210-a. Further, the linear regulator and the opto-coupler module may be implemented in a feedback loop back to the switches of the inverter circuit (or switch network) via the controller 106. The controller 106 may then adjust the switching frequency based on these feedback signals. In some cases, only one of the output modules with an opto-coupler module (e.g., module 210-a), referred to as a Master Bulk module, may be configured to provide feedback signals. In this way, the Master Bulk module may dictate the output voltages delivered by at least a portion of the other output modules, including the other output modules with an opto-coupler module (e.g., module 212-a with opto-coupler module 110-b, module 214-a with opto-coupler module 110-c).

Figure 5:
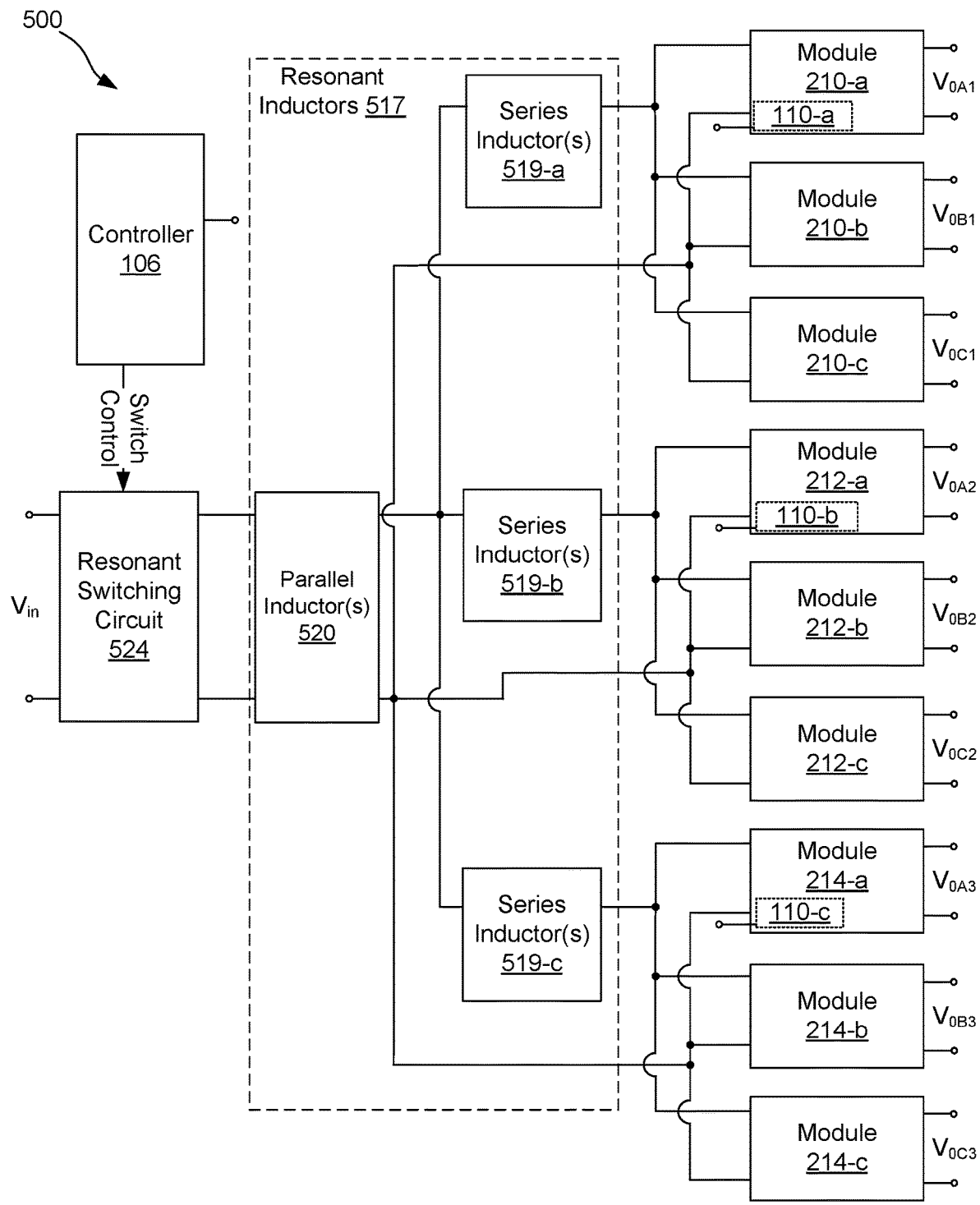
FIG. 5 illustrates a system diagram of a resonant converter according to an alternate embodiment of the disclosure.

FIG. 5 illustrates a system diagram of a resonant converter 500 according to an alternate embodiment of the disclosure. Resonant converter 500 implements one or more aspects of the figures described herein. For ease of representation, the resonant converter 500 is shown as having a resonant switching circuit 524, where the resonant switching circuit 524 comprises an inverter circuit (e.g., inverter circuit 102 in FIGS. 1-4) and a resonant capacitor bridge (e.g., resonant capacitor bridge 218 in FIG. 2, resonant capacitor bridge 318 in FIGS. 3 and/or 4). The resonant converter 500 may also comprise a controller 106 configured to generate a switch control signal for adjusting the switching frequency of the inverter circuit. In some cases, the inverter circuit may be implemented as a switch network, and may comprise a half-bridge configuration of MOSFETs, although other types of switches (e.g., JFETs, BJTs, etc.) in different configurations (e.g., full bridge configuration) are contemplated in different embodiments. In the example shown in FIG. 5, the resonant inductors 517 of the resonant tank may comprise one or more parallel inductor(s) 520 and one or more series inductor(s) 519 (e.g., series inductors 519-a, series inductors 519-b, series inductors 519-c) for each branch of the resonant tank. In some cases, for instance, when multiple parallel inductor(s) are used and shared between the one or more branches, they may appear as a single parallel inductor 520 in the resonant tank. While FIGS. 3-4 showed the one or more parallel inductors arrange to the right of the series inductors, or between the one or more series inductors and the output modules, here, the multiple parallel inductors have been replaced by a single parallel inductor 520 (or a string of series-coupled inductors) arranged to the left of the series inductors 519. In other words, the parallel inductor(s) 520 is arranged between the resonant switching circuit 524 and the series inductors 519. As an example, the total inductance value for two inductors ($L_x$ and $L_y$) arranged in parallel may be calculated using the sum of their reciprocal values $$\frac{1}{L_x} \text{ and } \frac{1}{L_y},$$

respectively. Specifically, when $L_x$ and $L_y$ are arranged in parallel, they may be appear as a single inductor ($L_{pz}$), where the inductance of $L_{pz}$ may be represented by:

$$\frac{1}{L_{pz}} = \frac{1}{L_x} + \frac{1}{L_y}, \tag{1}$$

which may be simplified to:

$$L_{pz} = \frac{L_x \times L_y}{L_x + L_y}. \tag{2}$$

Contrastingly, when a plurality of inductor(s) are arranged in series, their total inductance value may be represented by a sum of their individual inductance values. For instance, when $L_x$ and $L_y$ are arranged in series, they may be appear as a single inductor ($L_{sz}$), where the inductance of $L_{sz}$ may be represented by:

$$L_{sz} = L_x + L_y \tag{3}.$$

In some embodiments, the single parallel inductor 520 may be shared between the one or more branches. In some aspects, the single parallel inductor 520 may facilitate in balancing the resonant tank gains of each branched series inductor 519. In this way, the primary input current may be divided into branches such that each branched series inductor 519 may be subjected to only a fraction (i.e., depending on the number of branches or number of branched series resonant inductors 519) of the maximum input current. In the example shown in FIG. 5, and assuming the series inductors 519-a, 519-b, and 519-c are of the same or equal magnitude, each series inductor 519 may only be subject to a third of the maximum input current (i.e., since there are three branches). In some cases, by moving the parallel inductor to the other side of the series resonant inductors seen in FIGS. 3 and/or 4, a single choke in this position may be realized with the same or similar size core as that of FIGS. 1 and/or 2, which may serve to deliver a resonant tank with similar gain/frequency characteristics to that of FIGS. 1 and/or 2. It should be noted that, the topology shown in FIGS. 5 and/or 6 may be scaled to higher powers, for instance, by increasing the number of branches of series inductors. In some examples, higher power levels may be supported by increasing the number of parallel connected transformer primary windings connected in parallel to each branch.

In some embodiments, each branch may be coupled to one group of modules (e.g., first group of modules 210, second group of modules 212, third group of modules 214, etc.) such that the single parallel inductor 520 is coupled in parallel across the parallel coupled primary windings of the different groups of transformers. Said another way, the primary windings of the transformers in each group of transformers may be coupled in parallel (i.e., since one end of the primary windings of each transformer in a group is coupled in series to one end of the series inductor 519 in a respective branch and the other end of the primary windings in the group is coupled to the inverter circuit of the resonant switching circuit 524), and the single parallel inductor 520 may be coupled in parallel across the different groups of transformers (i.e., since one end of the parallel inductor 520 and the other end of each primary winding of the different groups of transformers is coupled to the inverter circuit of resonant switching circuit 524). Said yet another way, transformers or modules 210 in a given branch may be coupled to a series inductor 519 in their respective branch, while all transformers or modules, regardless of branch, are coupled to the single parallel inductor 520.

Figure 6:
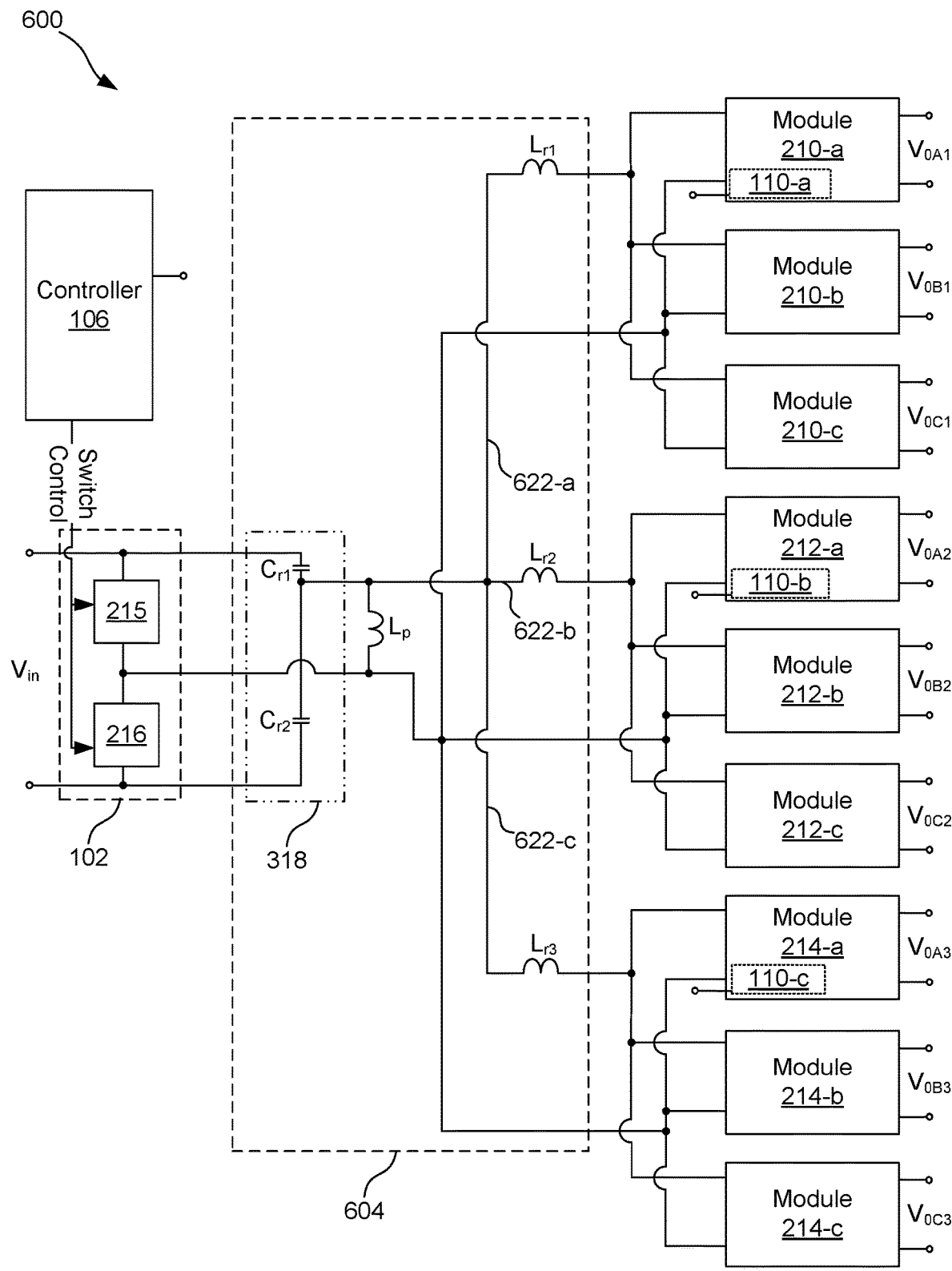
FIG. 6 illustrates a schematic diagram of the resonant converter in FIG. 5 according to an alternate embodiment of the disclosure.

FIG. 6 illustrates a schematic diagram of a resonant converter 600, which may be similar or substantially similar to the resonant converter 500 in FIG. 5. As seen in FIG. 6, the resonant converter 600 comprises a resonant tank 604 having a single parallel inductor (i.e., $L_p$) shared between branches 622-a, 622-b, and 622-c, which is in contrast to the topology seen in FIGS. 3 and 4, where the resonant tank 304 comprises a parallel inductor for each branch 322. In some embodiments, each branch 622 comprises a series resonant inductor (e.g., $L_{r1}$, $L_{r2}$, $L_{r3}$) coupled at one end to the parallel inductor ($L_p$) and the resonant capacitor bridge 318 and coupled at another end to the primary windings of the transformers of a respective group.

In some cases, resonant tank 604 further comprises a resonant capacitor bridge 318, where the resonant capacitor bridge 318 may be coupled across the inverter circuit 102. In some examples, the inverter circuit 102 comprises switches 215 and 216. The resonant capacitor bridge 318, inverter circuit 102, modules 210, 212, 214, controller 106, and optional opto-coupler modules 110 may be similar or substantially similar to the ones previously described in relation to any of FIGS. 1-5.

Figure 7:
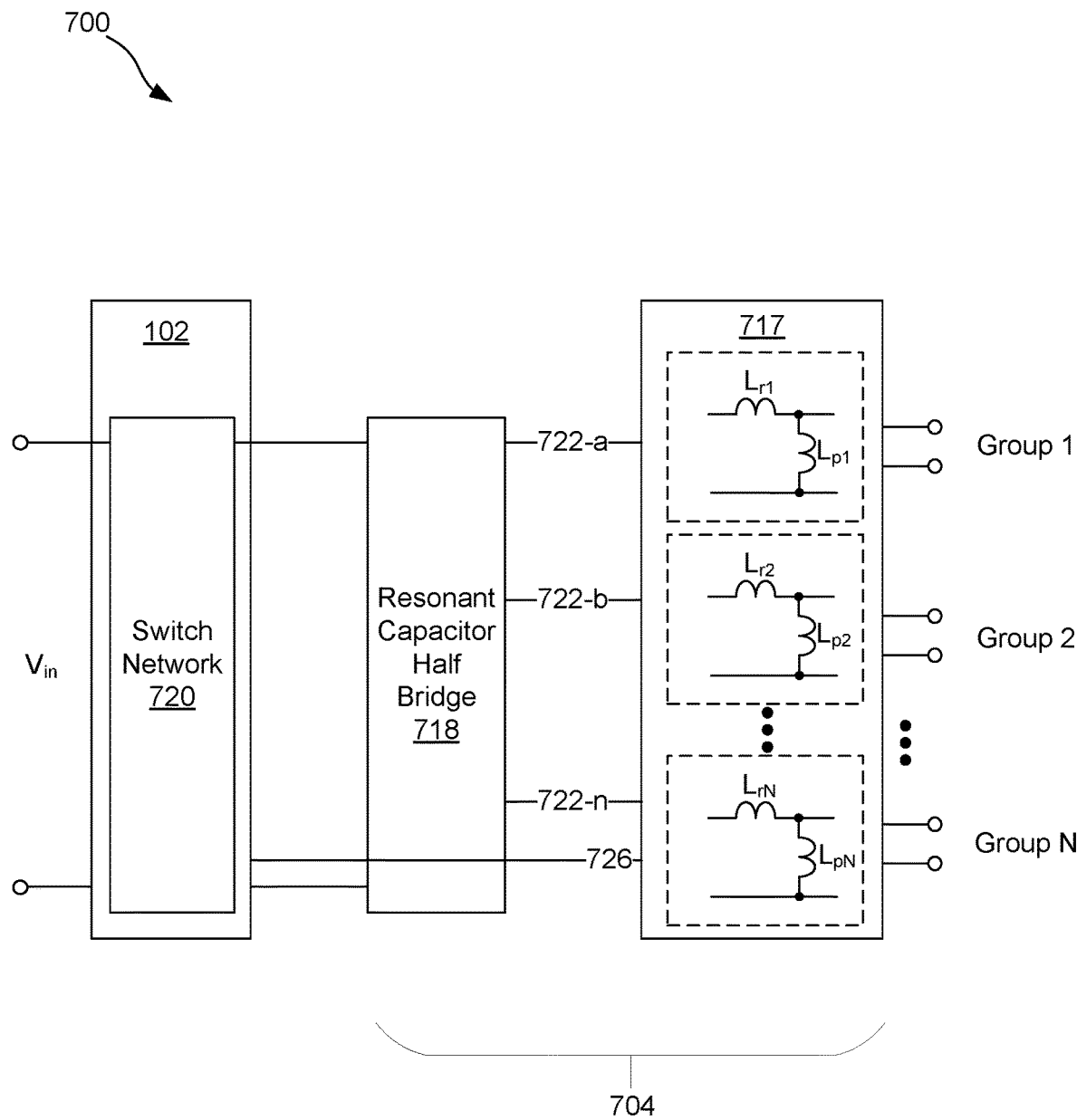
FIG. 7 illustrates an example of resonant converter having a first inductor network topology according to an embodiment of the disclosure.
Figure 8:
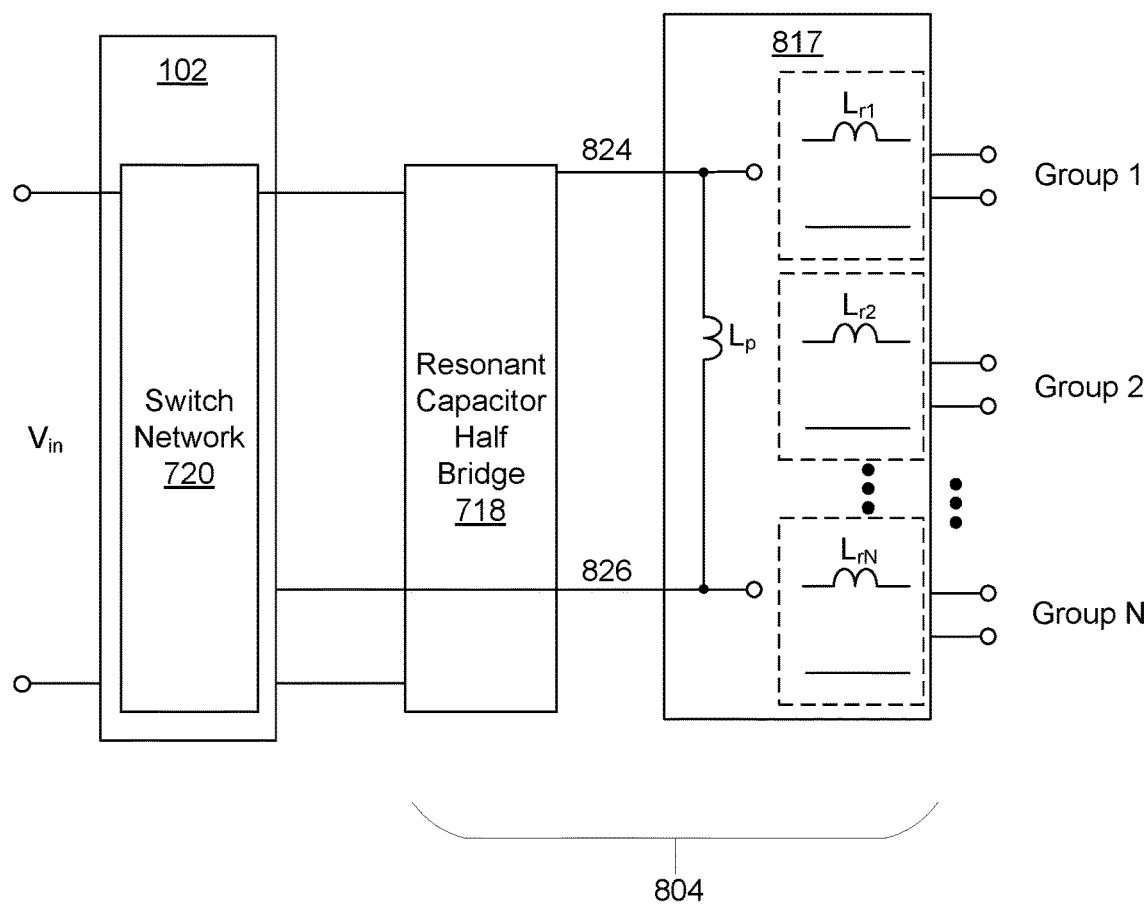
FIG. 8 illustrates an example of a resonant converter having a second inductor network topology according to an alternate embodiment of the disclosure.
Figure 9:
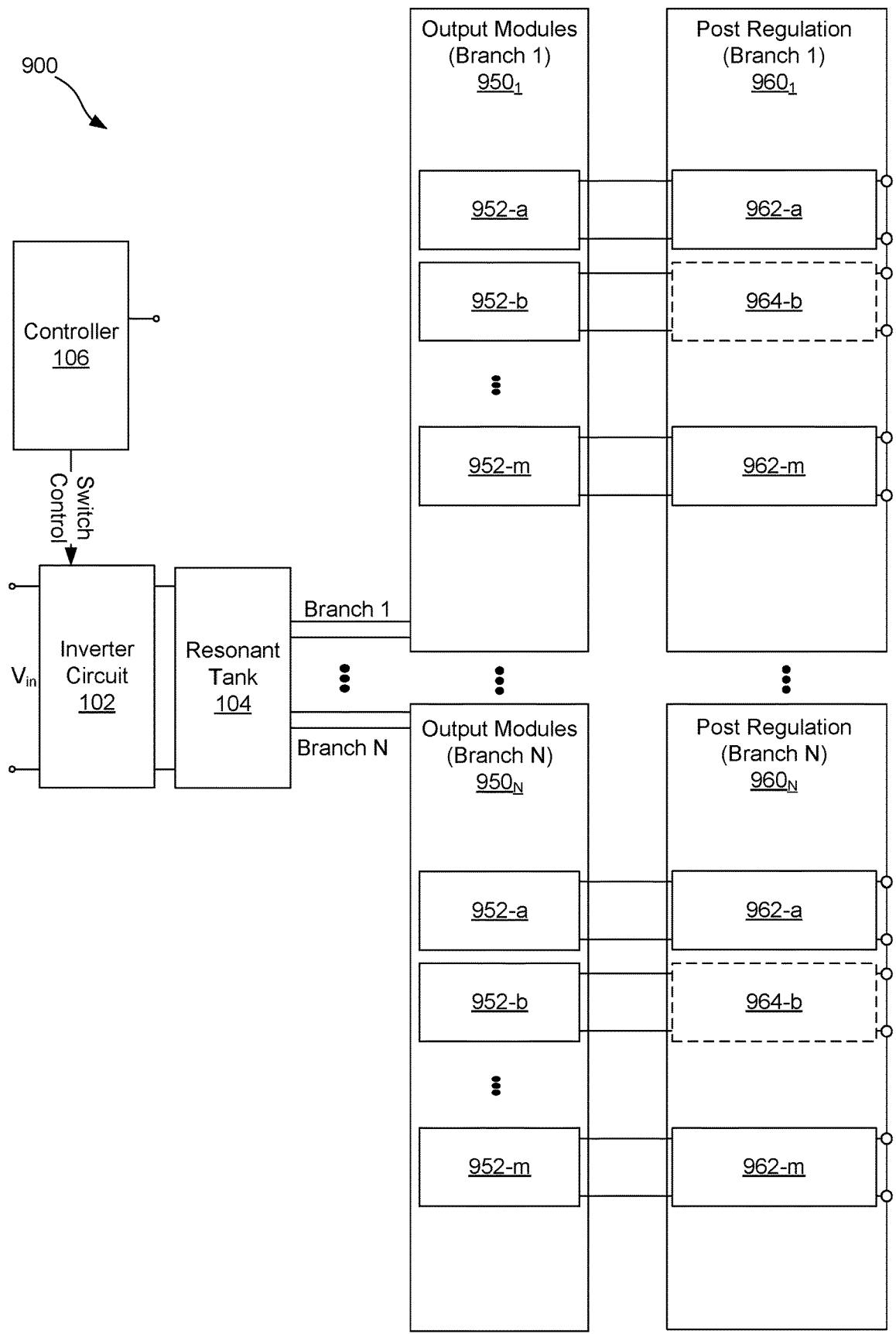
FIG. 9 illustrates an example of a resonant converter showing one or more output modules coupled to post regulators, according to an embodiment of the disclosure.

Although the examples illustrated thus far have shown three branches, one of skill in the art will appreciate that any number, N, of two or more branches can be implemented, and FIGS. 7-9 help illustrate this generalization. FIG. 7 illustrates an example of a resonant converter 700 having a first inductor network topology according to an embodiment of the disclosure. In some examples, resonant converter 700 may implement one or more aspects of the figures described herein. Resonant converter 700 may be similar or substantially similar to the resonant converters 300 and/or 400 previously described in relation to FIGS. 3 and/or 4, respectively.

Resonant converter 700 may comprise an inverter circuit 102, a resonant tank 704 having a resonant capacitor half bridge 718 coupled across the inverter circuit 102, and resonant inductors 717 arranged according to a first inductor network topology. As seen in FIG. 7, the first inductor network topology may be implemented by forming a plurality of branches 722 (e.g., N branches), each branch comprising a series resonant inductor (e.g., $L_{r1}$, $L_{r2}$, . . . , $L_{rN}$, etc.) and a parallel resonant inductor (e.g., $L_{p1}$, $L_{p2}$, . . . , $L_{pN}$, etc.). For instance, a first branch 722-a may comprise series inductor ($L_{r1}$) and parallel inductor ($L_{p1}$), while a second branch 722-b may comprise series inductor ($L_{r2}$) and parallel inductor ($L_{p2}$), and an $N^{th}$ branch 722-n may comprise series inductor ($L_{rN}$) and parallel inductor ($L_{pN}$). One end of the series inductor in each branch may be coupled to the resonant capacitor half bridge 718, while its other end may be coupled to the primary windings of the transformers in one group of the one or more groups (e.g., Group 1, Group 2, Group N, etc.). Additionally, one end of the parallel inductor in a respective branch may also be coupled to the other end of the series inductor in the branch, as well as the primary windings of the transformers in a respective group coupled to the branch. In some cases, the other end of the parallel inductor in each branch may be coupled to the inverter circuit 102 via connection 726.

In some embodiments, the inverter circuit 102 may be an example of a switch network 720. In some examples, DC input (represented as $V_{in}$) to the resonant converter 700 may first be converted to an AC signal, such as a square wave signal, by the switch network 720. The AC signal may in turn be fed to the plurality of transformers of Groups 1 through N through the resonant capacitor half bridge 718 coupled across the switch network 720, and the resonant inductors 717.

FIG. 8 illustrates an example of a resonant converter 800 having a second inductor network topology according to an embodiment of the disclosure. In some examples, the resonant converter 800 may be similar or substantially similar to the resonant converter 500 and/or 600 previously described in relation to FIGS. 5 and/or 6, and may comprise a resonant tank 804 having a resonant capacitor half bridge 718 and resonant inductors 817. As seen, the inductor network topology of the resonant inductors 817 in FIG. 8 may comprise the use of a single parallel inductor (i.e., $L_p$) shared between multiple branches, each branch having at least one series resonant inductor (e.g., $L_{r1}$, $L_{r2}$, . . . , $L_{rN}$). Connection 824 may couple one end of the parallel inductor ($L_p$) and one end of the series resonant inductor (e.g., $L_{r1}$, $L_{r2}$, . . . , $L_{rN}$) in each branch to the resonant capacitor half bridge 718, while connection 826 may couple the other end of the parallel inductor ($L_p$) and the primary windings of the transformers in each group (i.e., Groups 1 through N) to the inverter circuit 102. In some aspects, the single parallel inductor (i.e., $L_p$) may facilitate in balancing the resonant tank gains of each branched series inductor (e.g., $L_{r1}$, $L_{r2}$, . . . , $L_{rN}$). In this way, the primary input current may be divided into branches such that each branched series inductor may be subjected to only a fraction (e.g., $Current_{max}/N$ where N is the number of branches) of the maximum input current. In some cases, by moving the parallel inductor to the other side of the series resonant inductors seen in FIGS. 3 and/or 4, a single choke in this position may be realized with the same or similar size core as that of FIGS. 1 and/or 2, which may serve to deliver a resonant tank with similar gain/frequency characteristics to that of FIGS. 1 and/or 2. It should be noted that, the topology shown in FIG. 8 depicts the topology shown in FIGS. 5 and/or 6 scaled to a higher power (i.e., 'N' instead of 3, where N>3). In this way, scaling can be achieved with far less increase in consumed board space than if the purely branched topologies of FIGS. 3-4 are scaled. Additionally or alternatively, higher power levels may be supported by increasing the number of parallel connected transformer primary windings connected in parallel to each branch.

In some examples, the resonant converter 800 may also comprise a controller (e.g., shown as controller 106 in FIGS. 5 and/or 6) configured to generate a switch control signal for adjusting the switching frequency of the inverter circuit 102. In some cases, the switch network may comprise a half-bridge configuration of MOSFETs, although other types of switches (e.g., JFETs, BJTs, etc.) in different configurations (e.g., full bridge configuration) are contemplated in different embodiments.

In some embodiments, each branch may be coupled to one group of modules (e.g., shown as first group of modules 210, second group of modules 212, third group of modules 214, etc., in FIGS. 5 and/or 6) such that the single parallel inductor (e.g., $L_p$) is coupled in parallel across the parallel coupled primary windings of the different groups of transformers. Said another way, the primary windings of the transformers in each group of transformers may be coupled in parallel (i.e., since one end of the primary windings of each transformer in a group is coupled in series to one end of the series inductor (e.g., $L_{r1}$) in a respective branch and the other end of the primary windings in the group is coupled to the inverter circuit 102 via connection 826), and the single parallel inductor may be coupled in parallel across the different groups of transformers (i.e., since one end of the parallel inductor and the other end of each primary winding of the different groups of transformers is coupled to the inverter circuit 102 via connection 826). Said yet another way, transformers or modules in a given branch may be coupled to a series inductor in their respective branch, while all transformers or modules, regardless of branch, are coupled to the single parallel inductor.

FIG. 9 illustrates an example of a resonant converter 900 showing one or more output modules, some or all of which are coupled to post regulators, according to an embodiment of the disclosure. Resonant converter 900 implements one or more aspects of the resonant converters described throughout this application, including at least resonant converters 1100, 1300 and 1400 described in relation to FIGS. 11, 13 and 14, respectively. As seen, resonant converter 900 comprises controller 106, an inverter circuit 102, a branched resonant tank 104 comprising a resonant capacitor bridge (e.g., shown as resonant capacitor half bridge 718 in FIG. 8) and resonant inductors (e.g., shown as resonant inductors 717 or 817 in FIG. 7 or 8). In some cases, the resonant inductors may comprise at least one parallel inductor, and one or more branches, each branch including at least one series inductor. In some cases, each branch of the resonant tank may be coupled to a group of output modules or transformers, such that the primary windings of the transformers in a group are in parallel. For instance, in FIG. 9 the primary windings of the transformers in the output modules 952 of Branch 1 are in parallel, and those of transformers in the output modules 952 of Branch N are in parallel. In some cases, at least a portion of the output modules or transformers may be coupled to post regulators (e.g., a buck converter post regulator). As described above, some modules, such as Bulk modules, may not be coupled to post regulators. Instead, one of the Bulk modules (referred to as the Master Bulk Module, or simply Master Bulk Mod) may comprise an opto-coupler module (e.g., shown as opto-coupler module 110-$a$ in the preceding figures), or another means for transferring data over the isolation boundary, that is configured to control the switching frequency of the inverter circuit 102 by sending feedback to the controller 106. The controller 106 may adjust the switching frequency based on these feedback signals.

In the example shown in FIG. 9, the branched resonant tank 104 may be coupled to N branches or groups of output modules (e.g., branches of output modules $950_1, \ldots, 950_N$), each branch or group comprising up to M output modules (e.g., modules 952-$a$-$m$). It should be noted that, the number of output modules in each branch or group is not intended to be limiting. In some embodiments, different branches or groups of output modules may have different numbers of output modules (e.g., 'M' output modules in Branch 1 and 'P' output modules in Branch 2, where M≠P). In some embodiments, at least a portion of output modules of the one or more branches may be coupled to post regulators (e.g., buck converter post regulators, buck-boost converter post regulators, boost converter post regulators, etc.). There may be a first branch 9601 of post regulators (e.g., post regulators 962, 964) for the output modules 952 in branch 1, a second branch of post regulators for the output modules in branch 2, an "$N^{th}$" branch $960_N$ of post regulators (e.g., post regulators 962-$a$, 964-$b$) for the output modules 952 in branch N, and so on. In some instances, the post regulators 962 shown in FIG. 9 may be examples of linear regulators coupled to Bulk Modules, while the post regulators 964 may be examples of buck converter post regulators coupled to regulated modules, further described in relation to FIGS. 10A and 10B. As used herein, the term "regulated modules" refers to non-bulk modules using post regulation to achieve lower and trimmed outputs. It should be noted that, while the output from Bulk Modules is not regulated when a load condition exists, in some instances a post Field Effect Transistor (FET) regulator or other linear regulator may be used to regulate power in light- or no-load conditions, further described in relation FIG. 10B. However, while a load is connected to the output module, the FET regulator is turned on fully and does not contribute to control of the output, and thus for loaded conditions the Bulk Modules can be thought of as lacking post regulation.

Figure 10A:
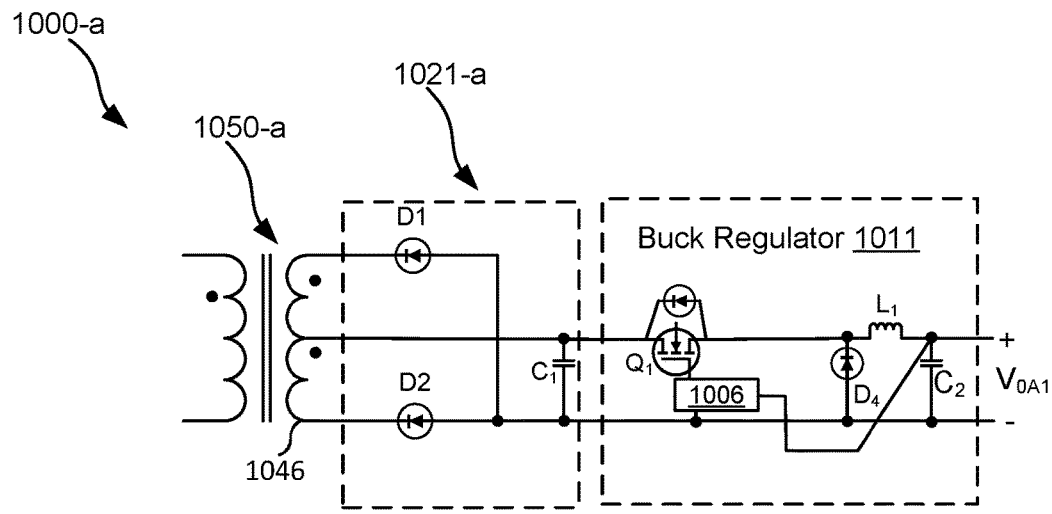
FIG. 10A illustrates an example of an output end of a regulated module, according to an embodiment of the disclosure.

FIG. 10A illustrates an example of an output end 1000-$a$ of a resonant converter, where the output end 1000-$a$ comprises an output module, the output module comprising transformer 1050-$a$ coupled to the resonant converter (not shown), a rectifier circuit 1021-$a$, and a post output regulation circuit, further described below. The post output regulation circuit may be used to regulate the output voltage of the output module or transformer 1050-$a$. In this example, the output module or transformer 1050-$a$ may be an example of a regulated module (i.e., not a Bulk Module). In some cases, the post output regulation circuit may be coupled between the secondary windings of the transformer 1050-$a$ and the output load (not shown), for instance, between the rectifier circuit 1021-$a$ coupled across the secondary windings 1046 of the transformer 1050-$a$ and the output load. In some embodiments, the rectifier circuit 1021-$a$ may comprise one or more switches (e.g., diodes $D_1$ and $D_2$) and may be selected from a group consisting of a half-wave and a full-wave rectifier, where the full-wave rectifier comprises one of a center tapped full wave rectifier or a bridge rectifier. It should be noted that other types of switches, such as MOSFETs, may be used in lieu of the diodes $D_1$ and $D_2$. In the example shown, the rectifier circuit 1021-$a$ comprises a center tapped full wave rectifier. As illustrated, the rectifier circuit 1021-$a$ comprises a first switch (e.g., diode $D_1$) coupled at a first end to a first end of the secondary windings 1046 of the center tapped transformer, and a second switch (e.g., diode $D_2$) coupled at a first end to a second end of the secondary windings 1046 of the center tapped transformer. In some cases, the rectifier circuit 1021-$a$ may further comprise a capacitor (e.g., $C_1$) configured to be coupled across the output load such that one end of the capacitor ($C_1$) is configured to be coupled to a central output winding of the center tapped transformer (i.e., transformer 1050-$a$), and another end of the capacitor ($C_1$) is configured to be coupled to a negative terminal of the output load and second ends of the first and second rectifier diodes or switches (e.g., diodes $D_1$ and $D_2$). Thus, the output of the transformer 1050-$a$ may be rectified by the rectifier circuit 1021-$a$ and further stabilized using the capacitor ($C_1$) to provide a stable output voltage at the output load.

While the rectifier circuit and capacitor $C_1$ may serve to provide a stable DC output voltage, the voltage at the positive terminal of capacitor $C_1$ may be different (e.g., higher or lower) than an output voltage desired at the load. As noted above, the output voltage delivered by an output module or transformer may be dictated by the switching frequency of the LLC resonant converter, where the switching frequency may be controlled using a control circuit of a Master Bulk Module through a controller (e.g., controller 106 in the preceding figures). In this case, the transformer 1050-a is an example of a regulated module which is not configured to control the switching frequency of the LLC resonant converter. In such cases, a post output regulation circuit may be utilized to step-up (e.g., using a boost regulator) or step-down (e.g., using a buck regulator) the rectified and stabilized voltage (i.e., voltage at $C_1$) delivered to the load.

As shown, the post output regulation circuit comprises a buck regulator 1011 having a switch $Q_1$, such as but not limited to a MOSFET, an inductor $L_1$, a diode $D_4$, and a capacitor $C_2$. In some embodiments, the buck regulator 1011 may also comprise a buck controller 1006 for monitoring current or voltage at a positive terminal of the capacitor ($C_2$) (or a node between inductor $L_1$ and capacitor $C_2$) and in response, controlling the switch ($Q_1$), for instance by controlling a connection between the gate of the switch ($Q_1$) and a ground return line (negative terminal of the output load). In this way, the buck controller 1006 may serve as a gate driver for the MOSFET or switch $Q_1$. In some cases, the buck controller 1006 may be configured to alternatively connect and disconnect a voltage from a center tap of the secondary windings 1046 of the transformer 1050-a or output module to inductor $L_1$ using the switch $Q_1$ to regulate the output voltage ($V_{oA1}$). Said another way, the buck controller 1006 may control the open and close of switch $Q_1$, which may serve to regulate the DC output voltage ($V_{oA1}$) delivered to a load. While not shown, the buck controller 1006 may also receive a reference voltage signal, where the reference voltage signal is associated with an output voltage desired at the load (i.e., a target voltage). The buck controller 1006 may be configured to compare the current output voltage (i.e., the voltage at the positive terminal of capacitor $C_2$) with the reference voltage signal, determine an error based on a difference between the reference voltage signal and the current output voltage, and adjust the timing of the switch $Q_1$ (i.e., when switch opens and closes, duration for which switch is open/closed) such that the error converges towards zero.

Figure 10B:
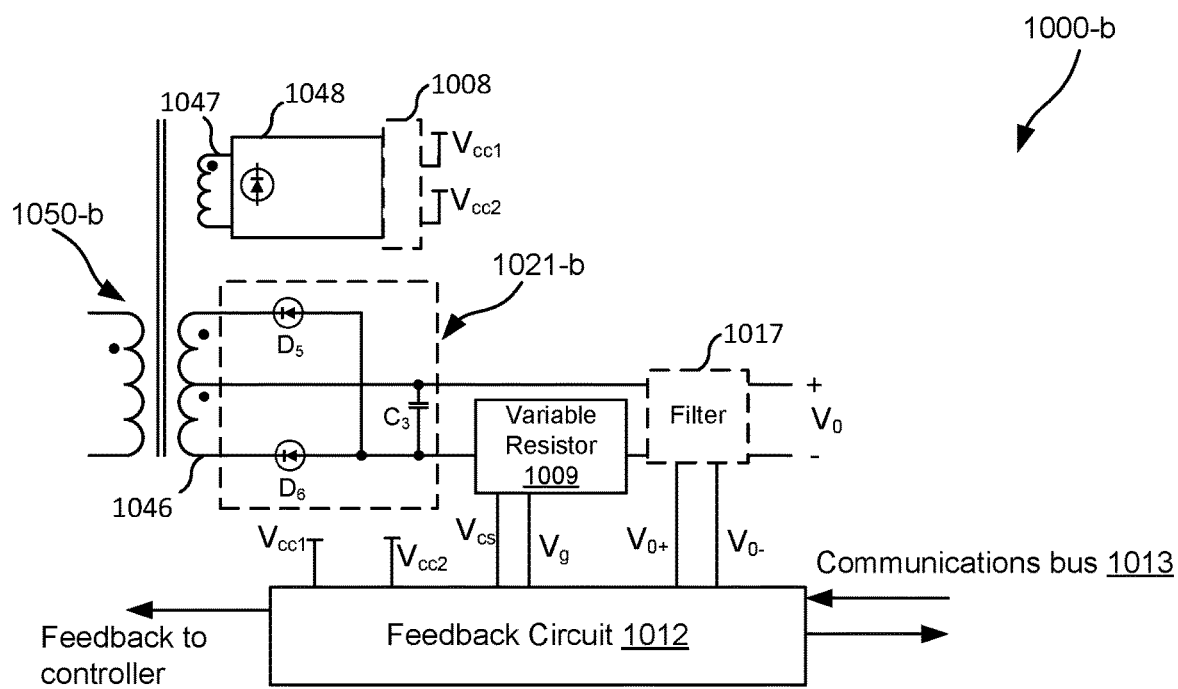
FIG. 10B illustrates an example of an output end of a bulk module, according to an embodiment of the disclosure.

FIG. 10B illustrates an example of an output end 1000-b of a resonant converter, where the output end 1000-b comprises an output module, such as a Master Bulk module (e.g., see dashed area in FIG. 2 of U.S. Patent Publication No. 2020220469, a rectifier circuit 1021-b, and control and regulation circuitry. FIG. 10B also shows a transformer 1050-b of the output module. In some embodiments, the control and regulation circuitry may be used to regulate the output voltage ($V_0$) of the output module based on measuring the $V_{0+}$ and $V_{0-}$ signals. As shown, the output end 1000-b comprises secondary windings 1046 of the transformer 1050-b, a primary rectifier circuit 1021-b comprising diodes $D_5$ and $D_6$ and capacitor $C_3$, a variable resistor 1009, an optional filter 1017 (shown as optional by the dashed lines), a feedback circuit 1012 coupled to a controller (e.g., shown as controller 106 in the preceding figures and in FIG. 11), and a communications bus 1013. The communications bus 1013 may be coupled to an electrical system associated with the load, for instance, for relaying electrical signals from the load. In some cases, the electrical signals may be associated with a reference voltage signal (i.e., a target voltage for the load), although other types of information may be relayed using the communication bus 1013 in different embodiments. It should be noted that, the rectifier circuit 1021-b illustrated in FIG. 10B is merely an example and is not intended to be limiting. FIGS. 12A-12E illustrate alternative rectifier topologies that may be used in lieu of the rectifier circuit 1021-b. In some cases, the variable resistor 1009 may be implemented using a current sensing resistor, a switch (e.g., a MOSFET), or a combination thereof. If the variable resistor 1009 comprises a current sensing resistor, $V_{CS}$ represents the voltage across the current sensing resistor. Additionally or alternatively, if the variable resistor comprises only a switch, $V_g$ represents an output of an amplifier, such as an op-amp, within the feedback circuit 1012. FIG. 11 describes in further detail the functioning of feedback circuit 1012.

In some embodiments, if the variable resistor 1009 comprises a switch, the switch is fully on when the output voltage, $V_0$, sees a load, or is controlled as a linear regulator during light- or no-load situations. In other words, during normal load situations, the variable resistor 1009 is not used for output voltage control and has little influence on the output. The optional filter 1017 may comprise one or more of an output filter inductor, a catch diode, and an output capacitor. In some cases, the output filter inductor may limit the ripple current through the output capacitor. In some cases, the output capacitor may comprise an electrolytic dielectric, although other types of capacitors may also be utilized. In some cases, the output filter inductor may also limit the rate at which the current through the switch of the variable resistor 1009 rises, for instance, due to a short circuit at the output load (i.e., short circuit between the $V_{o+}$ and $V_{o-}$ terminals). In some circumstances, for instance, when the switch of the variable resistor is turned off and there is a short circuit at the output load, the catch diode may circulate the current of the output filter inductor, which may alleviate the risk of avalanche breakdown of the switch of the variable resistor 1009.

In some cases, the output end 1000-b of the resonant converter comprises additional secondary windings 1047 for providing one or more DC voltages (e.g., $V_{cc1}$, $V_{cc2}$) to the feedback circuit 1012. A bulk rectifier 1048 may be coupled across the secondary windings 1047 to rectify the voltage at the secondary windings. In some non-limiting examples, the bulk rectifier 1048 may be implemented using a similar topology as the rectifier circuit 1021-b, any of the other rectifier circuit topologies seen in FIGS. 12A-E, or voltage multiplier rectifiers or combinations thereof (e.g., a bulk module could use a full-bridge rectifier for one bias and the other bias could use a voltage doubler stacked in series therewith). In some embodiments, a linear regulator 1008 may be coupled at an output of the bulk rectifier 1048 to control at least one DC voltage (e.g., $V_{cc1}$) delivered to one or more components of the feedback circuit 1012. In one non-limiting example, the feedback circuit 1012 may comprise one or more op-amps, where $V_{cc1}$ is a supply voltage delivered to an op-amp of the feedback circuit 1012, and $V_{cc2}$ is fed to a non-inverting input (i.e., positive input terminal) of the op-amp, for instance, via a resistive network. In some cases, an output voltage of at least one op-amp of the feedback circuit 1012 may be used as the feedback to the primary controller (e.g., shown as controller 106 in the preceding figures and in FIG. 11).

Turning now to FIG. 11, which depicts a detailed schematic diagram of a resonant converter 1100 coupled to two bulk modules in parallel branches (i.e., transformer TA in Slot 1 of Branch 1, and transformer $T_D$ in Slot 1 of Branch 2). In some cases, each branch may comprise a plurality of sets of pins or terminals for coupling output modules. In this example, transformer TA may be an example of a Master Bulk Module and transformer $T_D$ may be an example of a Slave Bulk Module. Slots configured to receive Bulk Modules (these can also accept modules with a buck converter regulator), may comprise additional pins or terminals as compared to slots configured to receive regulated modules (e.g., modules with a buck converter regulator, described in relation to FIG. 10A). Slots configured to receive regulated modules are not configured to receive bulk modules (i.e., they lack sufficient pins to accept bulk modules). In some cases, one or more pins of the Master Bulk Module may be connected to the collector and emitter respectively of an opto-coupler on the module side, $U_{1A}$. Also shown in FIG. 11 is the control circuit 106 (i.e., primary controller), feedback circuit 1012 (i.e., secondary controller), variable resistor 1009, and optional filter 1017 previously described in relation to 10B. In some cases, the current of the diode of $U_{1A}$ may be controlled by the Master Bulk Module to be dictated by the error between the module output voltage (i.e., $V_{oA}$) and a reference, for instance, when its output current exceeds a threshold (e.g., >5% of its rated output current). For output currents below this threshold, the opto-coupler diode current may be reduced to zero. In some cases, the Master Bulk Module may control the current of the diode of $U_{1A}$ via the feedback circuit 1012. In some cases, $V_{cc3}$ may be connected to the collector terminal of the bipolar transistor (e.g., $Q_4$ in FIG. 11) in the frequency control loop to provide a digital logic signal to controller 106 as to whether the Master Bulk Module is to dictate the LLC converter frequency. If $U_{1A}$ is on, then $I_{OPT\_ON}$>0 informing controller 106 that the Master Bulk Module is to dictate the LLC converter frequency. If $U_{1A}$ is off, then $I_{OPT\_ON}$=0 informing the controller 106 that the Master Bulk Module is not to dictate the LLC converter frequency.

In some embodiments, the switching frequency of the inverter circuit 102 may be controlled by the primary control circuit 106 of the resonant converter 1100 using the switch control signal. In some cases, the switch control signal provided by the primary control circuit 106 may be based in part on the emitter current of the opto-coupler, $I_{OPT\_FB}$, received from the feedback circuit 1012. The feedback circuit 1012 may be configured to set the current, $I_{OPT\_FB}$, in the feedback opto-coupler (e.g., opto-coupler module $U_{1A}$ in FIG. 11) to a level proportional to the inverter switching frequency so as to maintain the output voltage $V_o$ at the reference level. In some cases, if the opto-coupler diode current exceeds the level at which a PNP transistor, $Q_4$, is turned on, its collector current $I_{OPT\_ON}$, may exceed a threshold, $I_{OPT\_MIN}$. In some embodiments, the control circuit 106 (i.e., primary controller) of the resonant converter 1100 may be used to monitor the collector current. Further, when the collector current exceeds the threshold, the feedback circuit 1012 may dictate the LLC switching frequency by the emitter current of the opto-coupler, $I_{OPT\_FB}$. As noted above, the Master Bulk Module may be configured to dictate the LLC switching frequency of the inverter circuit during normal or heavy load situations (i.e., when a light load is not coupled across $V_{oA}$). In this way, the Master Bulk Module may adjust the switching frequency of the inverter circuit 102 via one or more of the primary and secondary controllers (i.e., control circuit 106 and feedback circuit 1012) to control $V_{oA}$ delivered across its output load.

In some other cases, for instance, if the collector current is below the threshold, the primary controller (i.e., control circuit 106) may take over control of the LLC switching frequency, which may serve to limit the level of power restrictions at the other modules. As an example, if a light load or no load is coupled across the Master Bulk Module, the LLC switching frequency may be controlled to a high level which may limit the power delivered to the remaining modules. However, the use of two different controllers (i.e., a primary controller, such as controller 106, and a controller for the Master Bulk Module, such as feedback circuit 1012) may allow the remaining modules to draw full power even though a light load or no load is coupled across the Master Bulk Module. As an example, if an output module with a buck converter regulator was installed at connector $J_B$ (slot 2) when a light load was coupled across the Master Bulk Module in Slot 1 of Branch 1, the output module at $J_B$ may be configured to draw full power, since the primary control circuit 106 acting alone dictates the switching frequency rather than in conjunction with the feedback circuit 1012.

In some cases, the output of a frequency control loop op amp (i.e., within the feedback circuit 1012) may be tied to $V_g$, which is connected to the switch within the variable resistor 1009 on the output side of the Master Bulk Module. Such a configuration may allow automatic transfer of control between the frequency control loop and the linear regulation loop. For instance, if the collector current drops below a threshold equivalent to a light- or no-load, the opto-coupler feedback may be disconnected (e.g., by toggling a logic output signal feedback "FB" to zero, or by some other means), which effectively disconnects the feedback circuit 1012 from the primary control circuit 106. In such cases, the primary controller responds to the cutoff of the feedback opto-coupler current (i.e., $I_{OPT\_FB}$) by taking over control of the switching frequency of the resonant converter.

In some cases, the series connected switch within the variable resistor 1009 may behave as a linear regulator at light or no-load conditions. In such cases, the series connected switch may follow the rectifier circuit 1021-b and may be used to keep the output voltage ($V_oA$) down (e.g., below a threshold) at light load. It should be noted that, the opto-coupler series resistance and bias level, $V_{cc3}$, may be selected such that for heavy loads, the feedback voltage to the controller (e.g., controller 106) may be greater than the gate source threshold voltage of the series connected switch within the variable resistor 1009.

FIG. 11 illustrates a detailed schematic diagram of a resonant converter 1100 according to an embodiment of the disclosure. Resonant converter 1100 may be similar or substantially similar to one or more of resonant converters 900, 1300, and/or 1400 described in relation to FIGS. 9, 13, and 14, respectively. In the example shown, resonant converter 1100 comprises an inverter circuit 102, which may be implemented as a switch network, a resonant capacitor bridge 1118, and two branches of resonant inductors (e.g., $L_{r1}$ and $L_{p1}$ in Branch 1, and $L_{r2}$ and $L_{p2}$ in Branch 2). In some cases, $L_{r1}$=$L_{r2}$ and $L_{p1}$=$L_{p2}$, although they may be different in other embodiments. For instance, in another embodiment, parallel inductors $L_{p1}$ and $L_{p2}$ can be replaced by a single parallel inductor arranged between the resonant capacitor bridge 1118 and the series inductors $L_{r1}$ and $L_{r2}$. Additionally, it should be noted that the number of branches is not intended to be limiting. For instance, in some embodiments, more than two branches may be deployed, as described later in relation to FIGS. 13 and/or 14. As seen, the resonant converter 1100 further comprises one or more connectors ($J_A$, $J_B$, $J_C$, $J_D$, $J_E$) in each branch. The primaries of the transformers (e.g., TA, $T_D$) may be connected to the LLC primary switching/resonant circuit via the connectors. For instance, connector $J_A$ comprising six terminals may be used to connect the primary winding of transformer TA to the resonant inductors and the inverter circuit 102. Similarly, connector $J_D$ also comprising 6 terminals may be used to connect the primary winding of transformer $T_D$ to the resonant inductors and the inverter circuit 102. In some embodiments, one or more connectors in each branch may comprise extra connections or terminals to accommodate Bulk Modules, such as transformers TA and $T_D$, in addition to regulated modules, such as output modules with a buck converter regulator. For instance, connectors $J_B$ and $J_C$ in branch 1, and connector $J_E$ in Branch 2 comprise two terminals, instead of the six seen for connectors $J_A$ or $J_D$. Connectors $J_B$, $J_C$, and/or $J_E$ may be utilized for regulated modules, such as output modules with a buck converter regulator.

In some circumstances, when multiple Bulk Modules are each on separate branches, they may be poorly coupled. Further, since one of the Bulk Modules serves as the Master Bulk module (i.e., dictates the switching frequency of the inverter circuit 102), the master control of the switching frequency may not provide the same input to other Bulk Modules on different branches. In such cases, the Slave Bulk modules (i.e., Bulk Modules not controlling the switching frequency) may receive separate input signals since the series inductors $L_{r1}$ and $L_{r2}$ prevent these Bulk Modules from being arranged in parallel. In some cases, Bulk Modules may not utilize output regulation (e.g., buck converter regulators), and may instead be unregulated or only use regulating (e.g., a FET regulator) during light- or no-load situations, as previously described in relation to FIG. 10B. Besides being more compact and cost effective, lack of post regulation, or post FET regulators, may also produce less heat and/or EMI noise than buck regulators. As described in relation to FIG. 10B, a switch (e.g., a MOSFET in the variable resistor 1009) on the output side of a Bulk Module may be either fully on, or at light load, may behave as a linear regulator during light- or no-load situations. In some cases, the bus on the bulk module may go up by 50% or higher when at light load. While the linear regulator circuit (shown as linear regulator 1008 in FIG. 10B) may provide some assistance in lowering the bus current or power, it may nonetheless get very hot. In some circumstances, this rise in temperature may exceed a safety threshold, which may cause the linear regulator or other components of the resonant converter and/or Slave Bulk module(s) to fail. In other cases, this rise in temperature may cause an output voltage delivered by the Slave Bulk module to be different from a reference voltage, which may adversely impact load performance.

To alleviate these issues, aspects of the current disclosure relate to enhancing coupling (or minimizing cross-regulation) between Bulk Modules on different branches. As seen in FIG. 11, the slave connector ($J_D$) has pin $p_1$ connected to the common connection of $L_{r2}$ and $L_{p2}$, and pin $p_2$ connected to the common connection of $L_{r1}$ and $L_{p1}$. Further, for the Bulk Modules in FIG. 11, respective pins $p_1$ and $p_2$ of connectors $J_A$ and $J_D$ may be connected together at the module side such that $L_{r1}$ is connected in parallel with $L_{r2}$ and $L_{p1}$ is connected in parallel with $L_{p2}$ when the Slave Bulk Module (i.e., transformer $T_D$) is connected to $J_D$. It should be noted that, if $L_{r1}$ and $L_{r2}$ are not connected in parallel with the two bulk modules installed, the cross regulation between their outputs would be much higher, which may adversely impact performance of the resonant converter 1100. This arrangement of resonant inductors and connectors may allow power to be delivered to multiple transformer primaries of various power levels while ensuring that only a portion of the primary power is delivered to a given branch when there is a short circuit on the secondary of transformers.

In some cases, for the Bulk Module connected to $J_D$, the current in the diode of the opto-coupler UM may be kept at zero unless the module deems that protection is warranted. In such cases, current may be injected into the diode such that the primary controller (e.g., controller 106) is alerted to the need for protection, for instance, based on the current $I_{OPT\_D\_SD}$ exceeding a threshold. The primary controller can then react by terminating the LLC switching for a period of time (e.g., 10 ms, 50 ms, 1 second, 1 minute, etc.) followed by LLC restart at high frequency (i.e., low power delivery).

FIGS. 12A-12E show some example topologies of rectifier circuits 1200-a, 1200-b, 1200-c, 1200-d, and 1200-e, respectively, in accordance with one or more implementations. These rectifier circuits show just some non-limiting examples of rectifier topologies that can be used in the output modules described herein. In some cases, any of the rectifier circuits 1200-a-e may be coupled to the secondary windings of the transformers of the output modules to rectify an AC voltage (e.g., sinusoidal output) to a DC waveform. In this way, the output voltage ($V_o$) provided to the output loads may be a DC voltage. In some cases, different transformers (e.g., of the same or a different branch) may utilize different ones of rectifier circuits 1200. For instance, Slave Bulk modules may utilize rectifier circuit 1200-a, while the Master Bulk module may utilize rectifier circuit 1200-e. Alternatively, all the transformers of a resonant converter may utilize the same rectifier circuit 1200 (e.g., rectifier circuit 1200-a). Some non-limiting examples of switches that may be used to implement the rectifier circuits 1200 may include diodes or MOSFETs.

Figure 13:
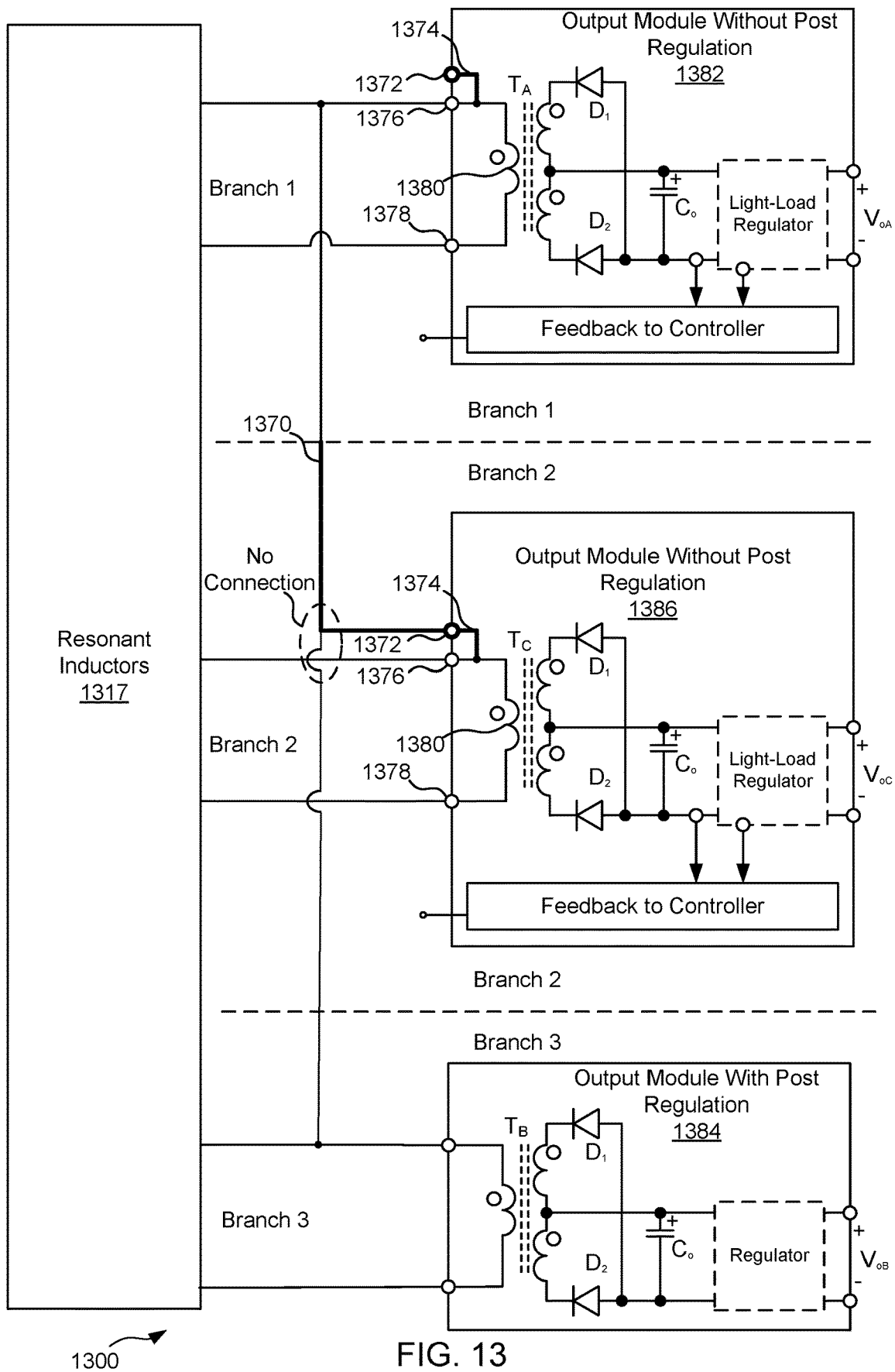
FIG. 13 illustrates an example of a resonant converter coupled to a plurality of output modules with and without post regulation, in accordance with one or more implementations.
Figure 14:
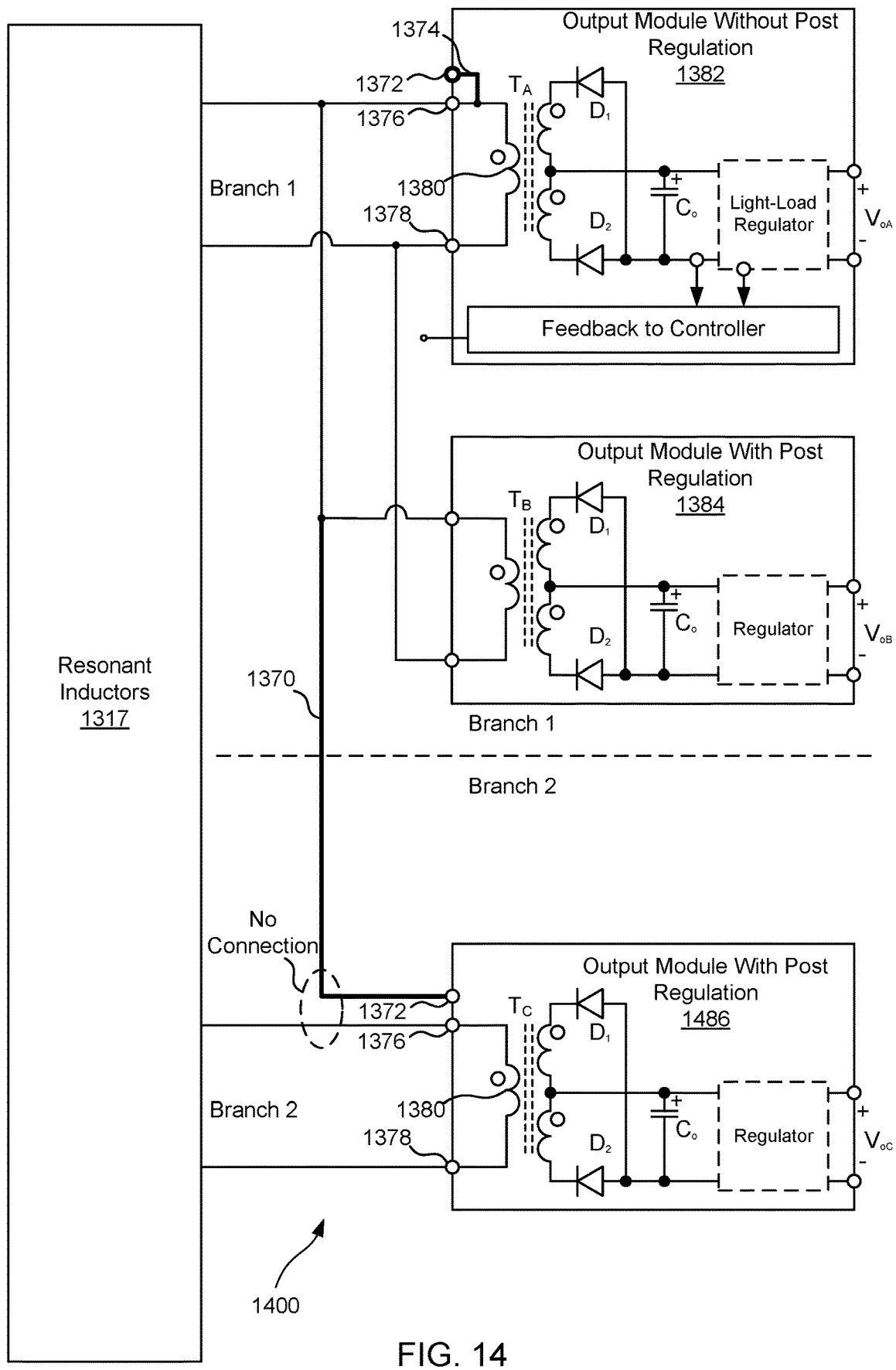
FIG. 14 illustrates an example of a resonant converter coupled to a plurality of output modules with and without post regulation, in accordance with one or more implementations.

FIG. 13 illustrates an example of a resonant converter 1300 coupled to a plurality of output modules with and without post regulation, in accordance with one or more implementations. FIG. 13 also shows resonant inductors 1317 of the resonant converter 1300. For instance, resonant converter 1300 is coupled to output modules 1382 and 1386 without post regulation, and an output module 1384 with post regulation. In this example, all three output modules 1382, 1386, and 1384 are coupled to separate branches of a branched resonant tank (e.g., 104). In some embodiments, one of the output modules without post regulation may serve as the Master Bulk Module, while the other(s) may be the Slave Bulk Module(s). In some cases, the Master Bulk Module may be configured to adjust the LLC switching frequency, and hence the output at the modules. In this case, output module 1382 serves as the Master Bulk Module. In this embodiment, the first terminal 1376 of each set of three terminals in a given branch, couples to a third terminal 1372 of each set of three terminals in another branch. However, only output modules without post regulation 1382, 1386 have internal circuitry to couple to the third terminal 1372. The output module with post regulation 1384 does not have circuitry to couple to the third terminal 1372. FIG. 14 illustrates an example of a resonant converter 1400 coupled to a plurality of output modules with and without post regulation, in accordance with one or more implementations. FIG. 14 implements one or more aspects of the figures described herein, including at least FIG. 13. As seen in FIG. 14, the output module without post regulation 1386 from FIG. 13 is replaced with an output module with post regulation 1486.

In a typical LLC resonant converter branched topology (e.g., see FIG. 4), each branch provides a high and low input (e.g., high input 1376 and low input 1378), and then a network of connections provide this same high and low input, in parallel, to the primary windings 1380 of each output module in the branch. In some cases, bulk modules and regulated modules in a given branch may each receive the same inputs and/or may each have the same first and second power terminals (e.g., two terminals 1376 and 1378). In some cases, these terminals may be similar or substantially similar to the pins $p_1$, $p_2$, etc., described in relation to FIG. 11. Bulk modules may also include one or more additional terminals, such as third terminal 1372, so that the Master Bulk module can provide feedback to a controller of the LLC resonant converter. This disclosure departs from traditional topologies by adding a high input connection 1370 between the third terminals 1372 of Bulk Modules on different branches. This connection 1370 alone, however, would have little effect, without an internal connection 1374 within the bulk modules, or any non-regulated modules. This internal connection 1374 effectively ties the first terminal 1376 to the third terminal 1372, but only where a bulk module having this internal connection 1374 is inserted into an output slot having this unique trio of terminals. It should be noted that, while regulated output modules can be inserted into these same slots, the connection 1370 may not play a role (i.e., since regulated output modules lack the internal connection 1374 (e.g., see FIG. 14)). When two Bulk Modules are used in separate branches, the connection 1370 along with the internal connection 1374, ties the high inputs of their respective transformers (e.g., TA and Tc) together and ensures that bulk modules in different branches see the same current and voltage (i.e., that they are coupled in parallel). Said another way, such a configuration may allow the Master Bulk module (e.g., module 1382) to effectively control the output for all Bulk Modules, including, output module 1386. In some cases, this improved coupling between Bulk Modules of different branches may translate to decreased cross-regulation between Bulk Modules.

Figure 15:
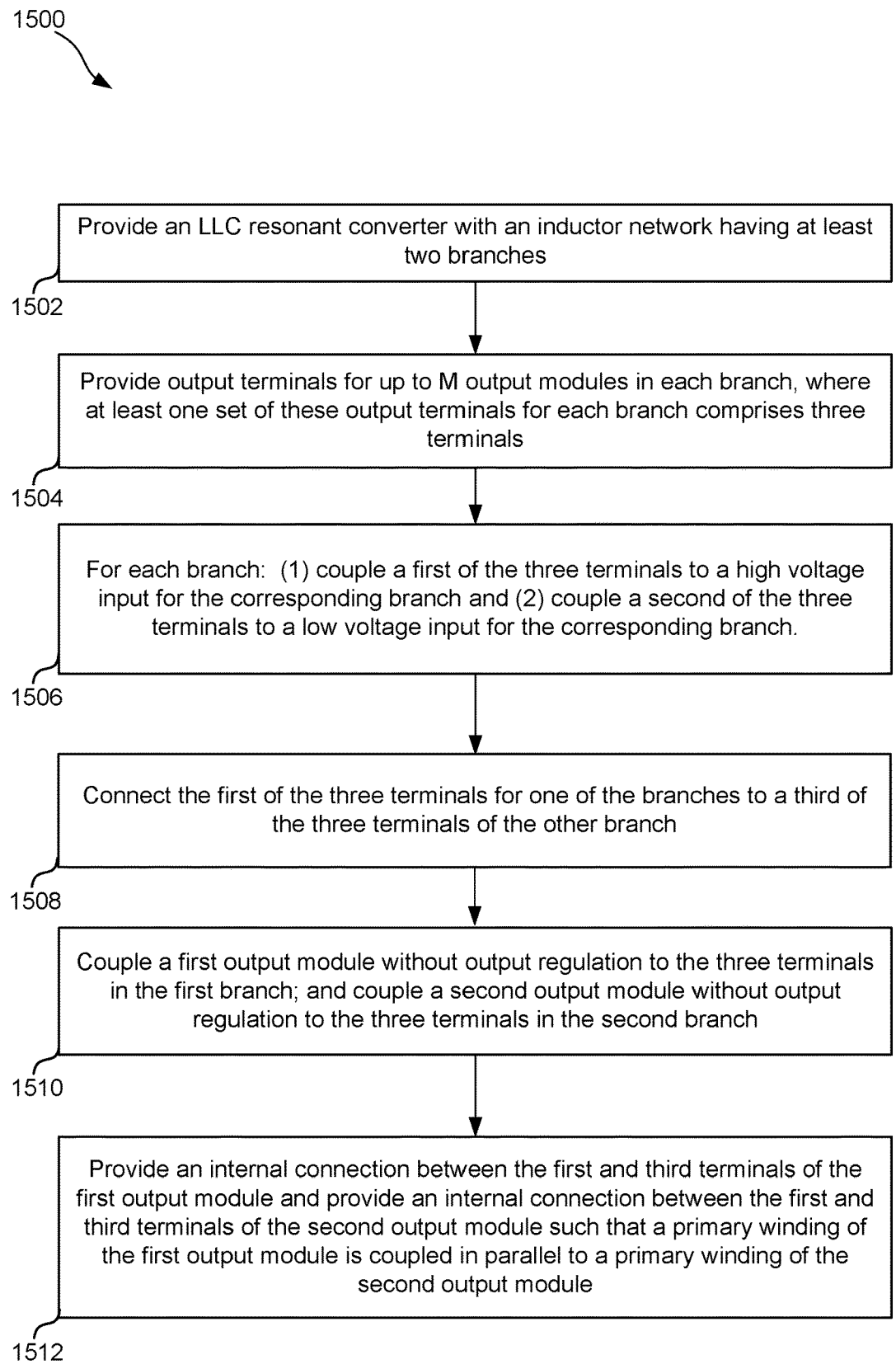
FIG. 15 is a flowchart of a method according to an embodiment of the disclosure.

FIG. 15 is a flowchart of a method 1500 according to an embodiment of the disclosure. In some embodiments, method 1500 implements one or more aspects of the figures described herein.

At Block 1502, the method 1500 may comprise providing an LLC resonant converter with an inductor network having two or more branches. The LLC resonant converter may be similar or substantially similar to any of the resonant converters described herein, including at least resonant converters 1300 and/or 1400 described in relation to FIGS. 13 and 14, respectively.

At Block 1504, the method may comprise providing output terminals for up to M output modules in each branch, where at least one set of these output terminals for each branch comprises three terminals.

At Block 1506, the method may comprise: for each branch, coupling a first of the three terminals (e.g., terminal 1376 in FIGS. 13 and/or 14) to a high voltage input for the corresponding branch, and coupling a second of the three terminals (e.g., terminal 1378 in FIG. 13) to a low voltage input for the corresponding branch. Further, at Block 1508, the method may comprise connecting the first of the three terminals for one of the branches to a third of the three terminals (e.g., terminal 1372 in FIG. 13) of another branch. As previously described in relation to FIG. 13, such a configuration may allow enhanced coupling (i.e., less cross regulation) between the Master Bulk module on one branch, and one or more Slave Bulk modules on other branches, which may facilitate control of the switching frequency by the Master Bulk module when the Master Bulk module is not connected to a light load.

At Block 1510, the method 1500 may comprise: coupling a first output module (e.g., output module without post regulation 1382 in FIGS. 13 and/or 14) to the three terminals in the first branch (e.g., Branch 1 in FIGS. 13 and/or 14). In some cases, this first output module may be an example of a Master Bulk module. Further, the method may comprise coupling a second output module (e.g., output module without post regulation 1386 in FIG. 13) to the three terminals in the second branch (e.g., Branch 2 in FIG. 13). This second output module may be an example of a Slave Bulk module, since it is a Bulk Module that does not control the LLC switching frequency.

At Block 1512, the method 1500 may comprise providing an internal connection (e.g., internal connection 1374 in FIGS. 13 and/or 14) between the first and third terminals of the first output module, and providing an internal connection (e.g., internal connection 1374) between the first and third terminals of the second output module, such that a primary coil or winding (e.g., primary winding 1380 of the output module 1382 in FIG. 13) of the first output module is coupled in parallel to a primary coil or winding (e.g., primary winding 1380 of the output module 1386 in FIG. 13) of the second output module.

Figure 16:
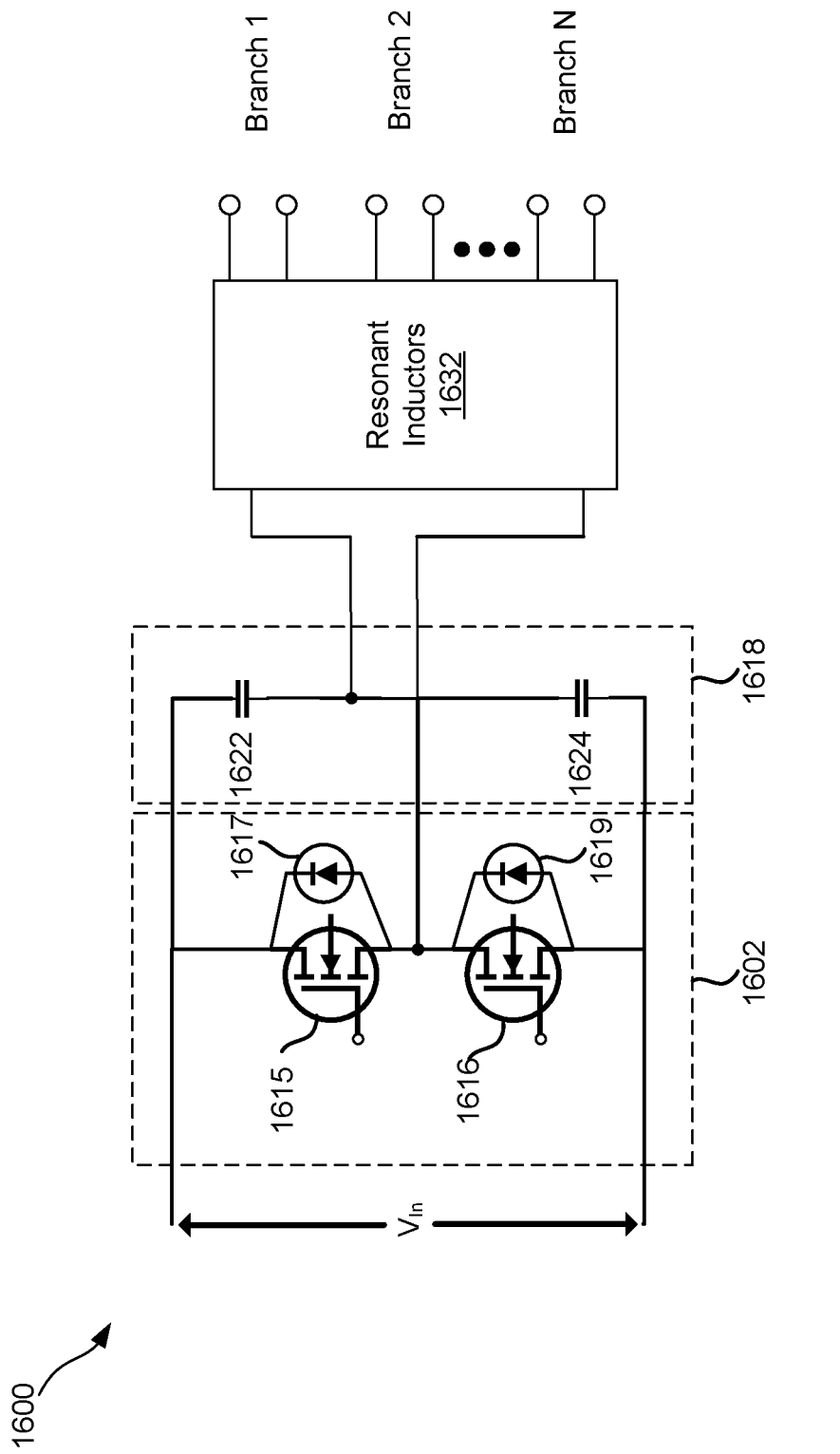
FIG. 16 illustrates a schematic diagram of a resonant circuit, in accordance with one or more implementations.

FIG. 16 illustrates an example schematic diagram 1600 of an inverter circuit (or switch network) and capacitor bridge in accordance with one or more implementations. As seen, FIG. 16 illustrates an inverter circuit 1602 having switches 1615 and 1616. In some cases, the switches 1615 and 1616 may be examples of MOSFETs arranged in a half-bridge configuration across the DC input ($V_{in}$). In some cases, the inverter circuit 1602 may be configured to convert the DC input signal to an AC signal (e.g., a square wave signal). In this example, the switches 1615 and 1616 are N type MOSFETs with body diodes 1617, 1619, although other types of switches (e.g., P type MOSFETs, BJTs, JFETs, FINFETs, etc.) are contemplated in different embodiments. Additionally, a resonant capacitor bridge 1618 comprising capacitors 1622 and 1624 arranged in series may be coupled across the inverter circuit 1602. The inverter circuit 1602 and resonant capacitor bridge 1618 may be similar or substantially similar to the inverter circuit 102 and resonant capacitor bridge 218 and/or 318, respectively, described in relation to FIGS. 1-8.

As described above, in some embodiments, one or more resonant inductors 1632 arranged according to one of the topologies described in relation to FIG. 7 or 8 may be coupled at one end to a center of the resonant capacitor bridge 1618 and at another end to a center of the inverter circuit 1602. In the example shown, Branches 1 through N provide connections for connecting one or more groups of output modules or transformers (e.g., shown as groups of modules 210, 212, 214 in FIG. 4), each group having a plurality of modules or transformers. In some cases, each branch (e.g., Branch 1) may be configured to couple to a group of transformers or modules (e.g., modules 210), where the group of transformers may comprise a plurality of transformers (e.g., modules 210-*a*, 210-*b*, 210-*c*). In some cases, the primary windings of the transformers in a group may be connected in parallel.

FIG. 18 illustrates an example schematic diagram 1800 of a rectifier network for a single branch, or alternatively, for bulk modules in different branches with the internal connections described in relation to FIG. 13. As seen, FIG. 18 illustrates a rectifier network 1821, which may be an example of any of the rectifier networks 321 and 1021 previously described in relation to FIGS. 3 and 4, and 10, respectively, and that could be implemented in embodiments similar to those shown in FIGS. 1-14. The rectifier network 1821 may be coupled at one end (e.g., end 1851) to the resonant inductors 1632 and at another end (e.g., end 1852) to the switch network, as previously described in relation to FIG. 16. Additionally, one end (e.g., end 1853) of the resonant inductors 1632 may be coupled to the resonant capacitor bridge, for instance, at a center of a resonant capacitor half bridge, while another end (e.g., end 1854) may be coupled to the switch network. In some examples, the voltage potential at ends 1852 and 1854 may be the same. For the sake of simplicity, FIG. 18 only illustrates one transformer group 1840 coupled to the resonant tank and switch network. In this example, the transformer group 1840 comprises three transformers, each having primary and secondary windings. In some cases, the primary windings 1842 of the transformers in the group may be coupled in parallel (i.e., if the transformers are in the same branch of the resonant tank, or if the transformers are bulk modules in separate branches with the internal connections of FIG. 13, such that the primary winding of a bulk module in one branch is coupled in parallel to the primary winding of another bulk module in a second, different branch), while each of their secondary windings 1846 may be coupled across a respective output load (optionally via output regulation using one of a linear regulator, a buck converter regulator, to name a few non-limiting examples). In some embodiments, the transformers may be examples of center tapped transformers. In some cases, a rectifier circuit may be coupled across the secondary windings 1844 of each center tapped transformer. The rectifier circuit may be implemented using switches (e.g., $SW_{1A}$, $SW_{2A}$, $SW_{1B}$, $SW_{2B}$, $SW_{1C}$, $SW_{2C}$, etc.), and may be selected from a group consisting of a half-wave and a full-wave rectifier, where the full-wave rectifier comprises one of a center tapped full wave rectifier or a bridge rectifier. For instance, FIGS. 12A-12E show some non-limiting examples of alternative rectifier topologies.

In the example shown, the rectifier network 1821 comprises one or more center tapped full wave rectifiers. In some examples, the output of each transformer may be rectified by a rectifier circuit (e.g., rectifier circuit 1860) and further stabilized using a capacitor to provide a stable output voltage at the output load. As illustrated, the rectifier circuit 1860 may comprise a first switch (e.g., $SW_{1A}$) coupled at a first end to a first end 1844-*a* of the secondary windings 1846 of the center tapped transformer, and a second rectifier switch (e.g., $SW_{2A}$) coupled at a first end to a second end 1844-*b* of the secondary windings 1846 of the center tapped transformer. Some non-limiting examples of switches that may be used to implement the rectifier circuit may include diodes or MOSFETs. In some cases, the rectifier circuit 1860 may further comprise a capacitor (e.g., $C_{OA}$) configured to be coupled across the output load such that one end of the capacitor is configured to be coupled to a positive terminal of the output and a central output winding of the center tapped transformer, and another end of the capacitor is configured to be coupled to a negative terminal of the output load and second ends of the first and second rectifier diodes or switches. In some cases, voltages $V_{OA}$, $V_{OB}$, $V_{OC}$ represent output voltages delivered to the respective output loads coupled to the secondary windings 1846 of the transformers. In some cases, a stable output voltage may refer to an output voltage where the difference between the minimum and maximum voltage is under a threshold (e.g., <1 volt, <10 volts, etc.). Additionally or alternatively, a stable output voltage may refer to an output voltage having a ripple voltage under a threshold. In some aspects, the capacitor (e.g., $C_{OA}$) coupled across the output load may be configured to smooth the rectified voltage waveform from the rectifier switch bridge configuration of the rectifier circuit 1860, which may serve to minimize the ripple voltage. The rectified voltage waveform from each rectifier switch bridge configuration may be smoothed by charging/discharging the respective capacitor, which may facilitate a cleaner DC signal with minimal ripple voltage at the output load. In some cases, the ripple voltage that appears after smoothing may vary depending on the capacitance of the capacitor, the output load, etc., to name a few non-limiting examples. Other filters or smoothing topologies beyond the capacitors illustrated may also be implemented.

Each of the three sets of transformers, switch pairs, and capacitors, can be an example of one of the output modules 108, 210, 212, 214, seen in FIGS. 1-6 or the output modules described in relation to FIGS. 9-11 and 13-14.

It should be noted that this disclosure is not limited to bulk module applications, but rather enhances operation of any LLC resonant converter using a branched resonant tank and at least two output modules without post regulation, and where those two modules are on separate branches.

Figure 17:
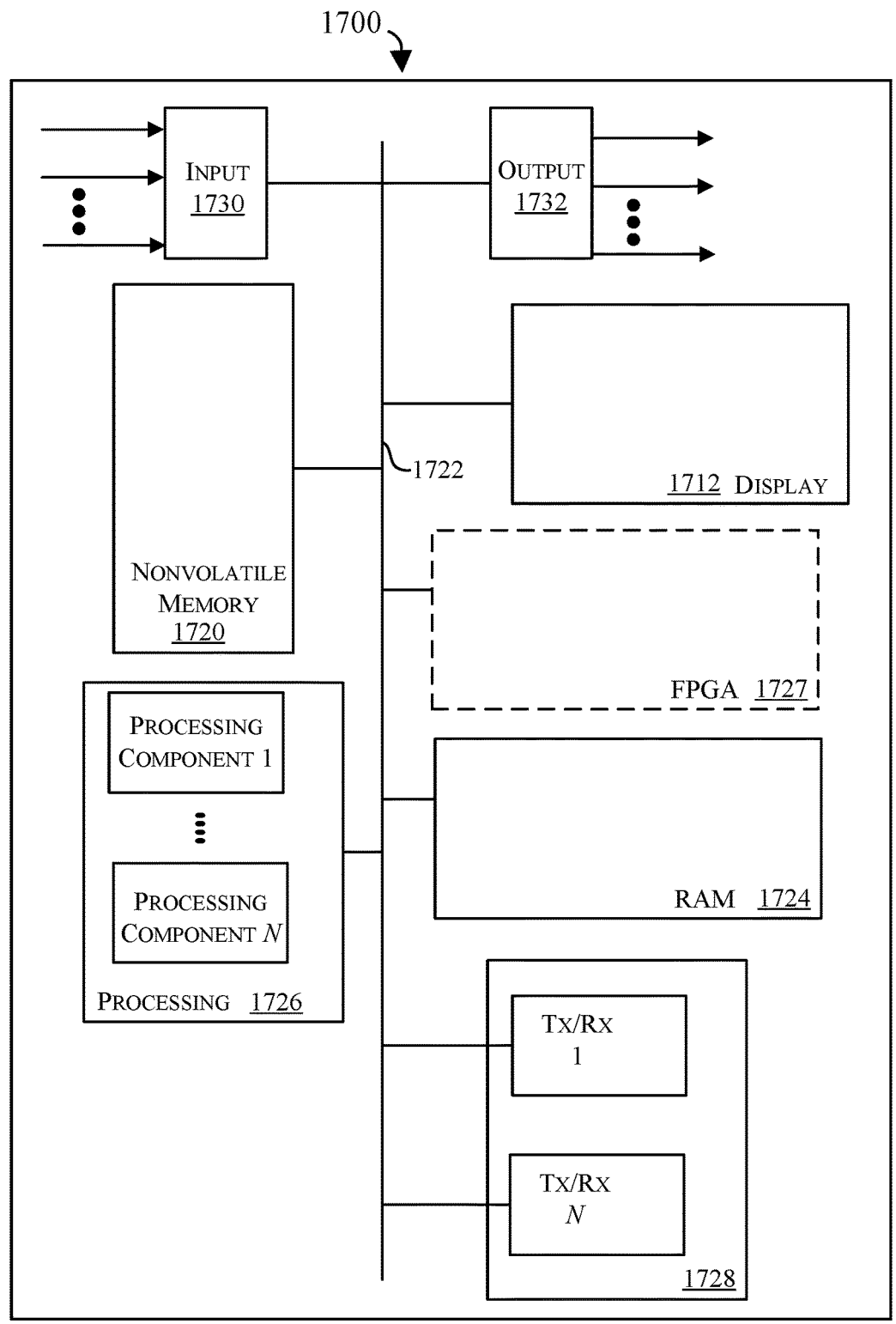
FIG. 17 is a block diagram illustrating a computer system according to one or more embodiments of the disclosure.

The methods described in connection with the embodiments disclosed herein may be embodied directly in hardware, in processor-executable code encoded in a non-transitory tangible processor readable storage medium, or in a combination of the two. Referring to FIG. 17 for example, shown is a block diagram 1700 depicting physical components that may be utilized to realize the controller 106 and/or feedback circuit 1012 according to an exemplary embodiment. As shown, in this embodiment a display portion 1712 and nonvolatile memory 1720 are coupled to a bus 1722 that is also coupled to random access memory ("RAM") 1724, a processing portion (which includes N processing components) 1726, an optional field programmable gate array (FPGA) 1727, and a transceiver component 1728 that includes N transceivers. Although the components depicted in FIG. 17 represent physical components, FIG. 17 is not intended to be a detailed hardware diagram; thus many of the components depicted in FIG. 17 may be realized by common constructs or distributed among additional physical components. Moreover, it is contemplated that other existing and yet-to-be developed physical components and architectures may be utilized to implement the functional components described with reference to FIG. 17.

This display portion 1712 generally operates to provide a user interface for a user, and in several implementations, the display is realized by a touchscreen display. In general, the nonvolatile memory 1720 is non-transitory memory that functions to store (e.g., persistently store) data and processor-executable code (including executable code that is associated with effectuating the methods described herein). In some embodiments for example, the nonvolatile memory 1720 includes bootloader code, operating system code, file system code, and non-transitory processor-executable code to facilitate the execution of a method described with reference to FIGS. 10A-B described herein.

In many implementations, the nonvolatile memory 1720 is realized by flash memory (e.g., NAND or ONENAND memory), but it is contemplated that other memory types may be utilized as well. Although it may be possible to execute the code from the nonvolatile memory 1720, the executable code in the nonvolatile memory is typically loaded into RAM 1724 and executed by one or more of the N processing components in the processing portion 1726.

The N processing components in connection with RAM 1724 generally operate to execute the instructions stored in nonvolatile memory 1720 to enable driving a plurality of output circuits from a DC input signal. For example, non-transitory, processor-executable code to effectuate the methods described herein may be persistently stored in nonvolatile memory 1720 and executed by the N processing components in connection with RAM 1724. As one of ordinarily skill in the art will appreciate, the processing portion 1726 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 1726 may be configured to effectuate one or more aspects of the methodologies described herein (e.g., the method described with reference to FIGS. 10-B and/or 15). For example, non-transitory processor-readable instructions may be stored in the nonvolatile memory 1720 or in RAM 1724 and when executed on the processing portion 1726, cause the processing portion 1726 to perform a method for driving a plurality of output circuits from a DC input signal. Alternatively, non-transitory FPGA-configuration-instructions may be persistently stored in nonvolatile memory 1720 and accessed by the processing portion 1726 (e.g., during boot up) to configure the hardware-configurable portions of the processing portion 1226 to effectuate the functions disclosed herein (including the functions of the controller 106 and/or feedback circuit 1012).

The input component 1730 operates to receive signals (e.g., measurements of one or more output voltages at the output loads, collector and emitter signals from the opto-coupler modules 110, etc.) that are indicative of one or more aspects of the techniques described herein. The signals received at the input component may include, for example, signals from the emitter and/or collector of the opto-coupler modules, control signals from a user interface, output voltage signals, data signals, and power control signals, to name a few non-limiting examples. The output component generally operates to provide one or more analog or digital signals to effectuate an operational aspect of the driving of a plurality of output circuits from a DC input signal. For example, the output portion 1732 may provide as output, a dataset pertaining to the output voltage signals at the different output loads, a dataset pertaining to the ripple voltage signals, etc.

The depicted transceiver component 1728 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A resonant converter circuit comprising:
   an inverter circuit;
   a resonant capacitor bridge coupled across the inverter circuit;
   N groups of output terminals, the terminals configured for coupling to up to M output modules; and
   a resonant inductor network configured to be coupled between the resonant capacitor bridge and primaries of transformers of the M output modules, the resonant inductor network comprising:
   at least one parallel inductor comprising a first end and a second end; and
   N parallel branches arranged in parallel and each branch comprising a series inductor, each of the series inductors configured for transformer-coupling to up to M of the M output modules and comprising:
   a first end coupled to the first end of the at least one parallel inductor via a first common node; and
   a second end coupled to a distinct output module of the M output modules;
   wherein the second end of the at least one parallel inductor is coupled to each of the distinct output modules via a second common node; and
   wherein M and N are positive integers.

2. The resonant converter circuit of claim 1, wherein the parallel inductor is one of N parallel inductors, each of the N parallel branches comprising one of the N parallel inductors.

3. The resonant converter circuit of claim 1, wherein a number of the at least one parallel inductor and a number of the series inductors is N.

4. The resonant converter circuit of claim 1, wherein a number of the series inductors is greater than a number of the at least one parallel inductors.

5. The resonant converter circuit of claim 1, wherein the inverter circuit comprises a half bridge pair of switches, and wherein the resonant capacitor bridge comprises a half bridge pair of capacitors.

6. The resonant converter circuit of claim 5, wherein the first end of the at least one parallel inductor is further coupled to the half bridge pair of switches and the second end of the at least one parallel inductor is further coupled to the half bridge pair of capacitors.

7. The resonant converter circuit of claim 1, wherein each of the N groups comprises up to M sets of terminals for coupling to up to the M output modules, and wherein at least one set of the up to M sets of terminals for each branch is a three-terminal set comprising at least three terminals.

8. The resonant converter circuit of claim 7, wherein a first terminal of the three-terminal set for each branch is coupled to a high voltage input for the corresponding branch, and wherein a second terminal of the three-terminal set for each branch is coupled to a low voltage input for the corresponding branch.

9. The resonant converter circuit of claim 8, wherein the first terminal of the three-terminal set for a first of the branches is connected to a third terminal of the three-terminal set of a second of the branches.

10. The resonant converter circuit of claim 9, wherein the three-terminal set of the first branch is configured for coupling to a master bulk output module, and wherein the three-terminal set of the second branch is configured for coupling to a slave bulk output module.

11. The resonant converter circuit of claim 10, wherein each of the master and slave bulk modules does not comprise output regulation at their respective loads.

12. The resonant converter circuit of claim 11, wherein the at least one set of terminals in the first branch having at least three terminals is configured for coupling to the master bulk module, and wherein the at least one set of terminals in the second branch having at least three terminals is configured for coupling to the slave bulk module.

13. The resonant converter circuit of claim 12, wherein the master bulk module comprises an internal connection between terminals configured for coupling to the first and third terminals in the three-terminal set of the first branch and wherein the slave bulk module comprises an internal connection between terminals configured for coupling to the first and third terminals in the three-terminal set of the second branch, such that a primary winding of the master bulk module is coupled in parallel to a primary winding of the slave bulk module.

14. The resonant converter circuit of claim 13, wherein the master bulk module is configured to control one or more of a switching frequency of the inverter circuit and respective output voltages of at least a portion of the M output modules, including the slave bulk module.

15. The resonant converter circuit of claim 1, wherein at least one of the M output modules comprises an output regulation circuit at a respective load, the output regulation circuit selected from a group consisting of: a buck regulator, a boost regulator, a buck-boost regulator, and an inverting regulator.

16. A power supply unit with one or more configurable outputs, the power supply unit comprising:
a resonant converter circuit having an inverter circuit, a resonant capacitor bridge coupled across the inverter circuit, and a resonant inductor network;
a controller;
N groups of output modules, each of the N groups comprising up to M sets of terminals configured for coupling to up to M output modules, the output modules each comprising:
a transformer having a primary and a secondary winding;
a rectified output coupled to the secondary and configured for coupling to a load;
wherein the resonant inductor network is configured to be coupled between the resonant capacitor bridge and the primaries of the transformers, the resonant inductor network comprising:
at least one parallel inductor comprising a first end and a second end; and
N parallel branches arranged in parallel, wherein each branch comprises a series inductor, each of the series inductors configured for transformer-coupling to the up to M output modules and comprising:
a first end coupled to the first end of the at least one parallel inductor via a first common node; and
a second end coupled to a distinct output module of the M output modules;
wherein the second end of the at least one parallel inductor is coupled to each of the distinct output modules via a second common node; and
at least one post output module regulator configured to be coupled between a respective secondary winding and a respective load of at least one output module, wherein one of the at least one post output module regulator is configured to couple to the controller and control a switching frequency of the inverter circuit;
wherein M and N are positive integers.

17. The power supply unit of claim 16, wherein at least one set of terminals for each branch comprises three terminals, and wherein a first terminal of the at least one set of terminals for each branch is coupled to a high voltage input for the corresponding branch, and wherein a second terminal of the at least one set of terminals for each branch is coupled to a low voltage input for the corresponding branch.

18. The power supply unit of claim 17, wherein a first terminal of the at least one set of terminals for a first branch is connected to a third of the terminal of the at least one set of terminals for at least one other branch, including a second branch, the power supply unit further comprising:
a first internal connection between first and third terminals of a first output module in the first branch, and a second internal connection between first and third terminals of a second output module in the second branch such that a primary winding of the first output module is coupled in parallel to a primary winding of the second output module, and wherein the one of the at least one post output module regulator is coupled between a secondary winding and load of the first output module.

19. A system comprising:
a resonant converter circuit having an inverter circuit, a resonant capacitor bridge coupled across the inverter circuit, and a resonant inductor network;

N groups of output modules, each of the N groups comprising up to M sets of terminals configured for coupling to up to M output modules, the output modules each comprising:
a transformer having a primary and a secondary winding, the secondary winding configured for coupling to a load;
wherein the resonant inductor network is configured to be coupled between the resonant capacitor bridge and the primaries of the transformers, the resonant inductor network comprising:
at least one parallel inductor comprising a first end and a second end; and
N parallel branches arranged in parallel, wherein each branch comprises a series inductor, each of the series inductors configured for transformer-coupling to the up to M output modules and comprising:
a first end coupled to the first end of the at least one parallel inductor via a first common node; and
a second end coupled to a distinct output module of the M output modules;
wherein the second end of the at least one parallel inductor is coupled to each of the distinct output modules via a second common node;
wherein at least one set of output terminals for each branch comprises three terminals, wherein a first of the three terminals for each branch is configured to be coupled to a high voltage for the corresponding branch, and wherein a second of the three terminals for each branch is configured to be coupled to a low voltage input for the corresponding branch,
wherein the first of the three terminals for a first branch is configured to be connected to a third of the three terminals of at least one other branch, including a second branch;
a first output module without output regulation, wherein the first output module is configured to be coupled to the three terminals in the first branch, and wherein the first output module comprises an internal connection between its first and third terminals;
a post output module regulator configured to be coupled between a secondary winding and a load of the first output module; and
a second output module without output regulation, wherein the second output module is configured to be connected to the three terminals in the second branch, and wherein the second output module comprises an internal connection between its first and third terminals such that a primary winding of the first output module is coupled in parallel to a primary winding of the second output module;
a non-transitory, tangible computer readable storage medium, encoded with processor readable instructions to perform a method for controlling a voltage provided to at least a portion of the output modules, including the first and second output modules, the method comprising:
receiving, from the first output module, a feedback signal; and
controlling a switching frequency for the inverter circuit based on the feedback signal;
wherein M and N are positive integers.

20. The system of claim 19, wherein the non-transitory, tangible computer readable storage medium is configured to control the switching frequency of the inverter circuit based at least in part on comparing a respective output voltage at the first output module with respect to a reference voltage, and wherein the method further comprises:
controlling respective output voltages of at least a portion of the output modules, including the second output module.

* * * * *